(12) United States Patent
Maeda et al.

(10) Patent No.: US 7,085,999 B2
(45) Date of Patent: Aug. 1, 2006

(54) INFORMATION PROCESSING SYSTEM, PROXY SERVER, WEB PAGE DISPLAY METHOD, STORAGE MEDIUM, AND PROGRAM TRANSMISSION APPARATUS

(75) Inventors: Junji Maeda, Tokyo-to (JP); Makoto Kobayashi, Machida (JP); Shinichi Torihara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 09/741,269

(22) Filed: Dec. 19, 2000

(65) Prior Publication Data

US 2001/0054049 A1 Dec. 20, 2001

(30) Foreign Application Priority Data

Dec. 21, 1999 (JP) .................................. 11-363485

(51) Int. Cl.
*G06N 3/00* (2006.01)
(52) U.S. Cl. ....................................... 715/513; 715/517
(58) Field of Classification Search ................ 715/513, 715/517, 501.1, 523, 700, 764, 530; 704/270
See application file for complete search history.

(56) References Cited

U.S. PATENT DOCUMENTS

| | | | | | |
|---|---|---|---|---|---|
| 5,438,657 | A | * | 8/1995 | Nakatani | 715/506 |
| 5,557,722 | A | * | 9/1996 | DeRose et al. | 715/513 |
| 5,588,099 | A | * | 12/1996 | Mogilevsky et al. | 715/508 |
| 5,721,848 | A | * | 2/1998 | Joseph | 715/764 |
| 6,088,675 | A | * | 7/2000 | MacKenty et al. | 704/270 |
| 6,151,624 | A | * | 11/2000 | Teare et al. | 709/217 |
| 6,230,173 | B1 | * | 5/2001 | Ferrel et al. | 715/513 |
| 6,279,006 | B1 | * | 8/2001 | Shigemi et al. | 707/101 |
| 6,490,602 | B1 | * | 12/2002 | Kraemer | 715/513 |
| 6,635,089 | B1 | * | 10/2003 | Burkett et al. | 715/513 |
| 2002/0023114 | A1 | * | 2/2002 | Ito | 707/523 |

OTHER PUBLICATIONS

Towers, J. Tarin Visual Quickstart Guide: Dreamweaver 2 for Windows and Macintosh. 1999. Peachpit Press, pp. ix and 129.*

* cited by examiner

*Primary Examiner*—Steven Hong
*Assistant Examiner*—Kyle Stork
(74) *Attorney, Agent, or Firm*—Scully, Scott, Murphy & Presser, P.C.; Lisa M. Yamonaco

(57) ABSTRACT

The present invention provides a means to display the contents of a document using a selected display condition, while preserving the layout of the document. It provides an information processing system comprising: a web browser for displaying a document having a predetermined layout; and a display controller for controlling a method used by the web browser to display the document. The display controller includes: a layout structure analyzer for analyzing the structure of the layout for the document; a region arrangement determiner for dividing a web page under a desired display condition, whereby the contents of the page are displayed in order to display the document in accordance with regions that are allocated and that reflect the structure of the document layout obtained by the layout structure analyzer; and an intra-region contents determiner for determining which contents of the document are to be displayed inside each of the allocated regions that are determined by the region arrangement determiner.

28 Claims, 29 Drawing Sheets

```
<HTML>
<HEAD>
<TITLE>
The title
</TITLE>
</HEAD>
<BODY>
<H1>Heading No. 1</H1>
<P>paragraph <I>italic</I> <B>bold</B> end para</P>
<P>abc <I>def <B>ghi</B> <BIG>jkl</BIG> mno</I> pqr</P>
</BODY>
</HTML>
```

HTML document

Heading No.1 paragraph *italic* bold end para abc *def ghi jkl mno* pqr

Display contents

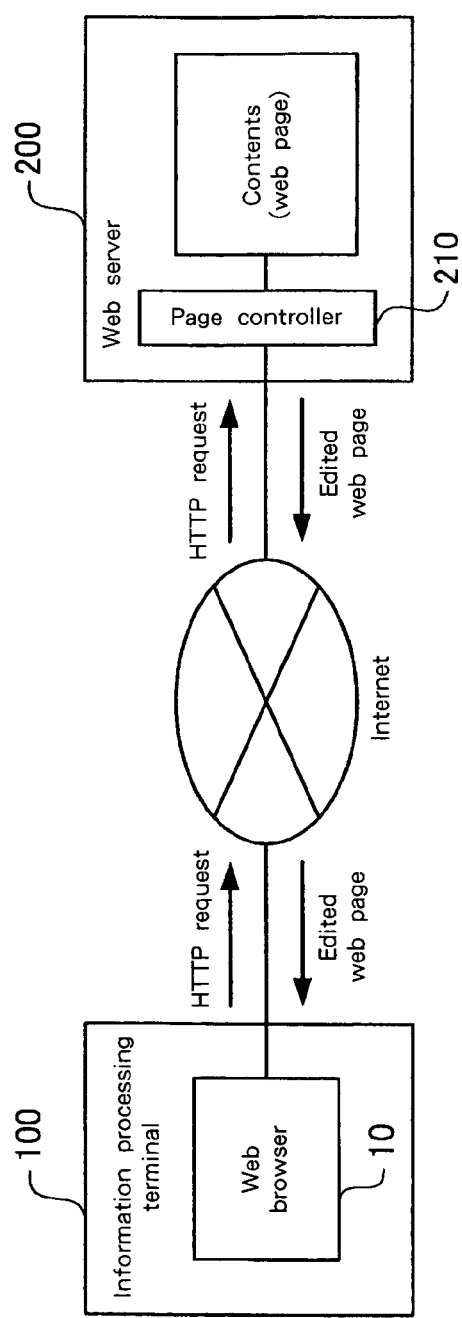

INFORMATION PROCESSING SYSTEM, PROXY SERVER, WEB PAGE DISPLAY METHOD, STORAGE MEDIUM, AND PROGRAM TRANSMISSION APPARATUS

FIELD OF THE INVENTION

The present invention relates to a system for displaying characters in a document, such as a Web page, under desired display conditions, while preserving the original layout of the document, and for summarizing the contents of the document, as needed.

BACKGROUND ART

When a user employs a computer to enter data or commands, he or she generally uses an input device, such as a keyboard or a mouse, and at the same time observes the characters or figures that appear on a display device. In this case, a technique is sometimes required for enlarging characters and/or images on a display device so that they can be seen more easily. In particular, such enlarged display is strongly needed by elderly or weak-sighted people to compensate their disability. Therefore, the characters on the screen of a display device must be magnified so that the user can read them.

Recently, as the use of computer networks has spread, to facilitate the performance of fundamental operations, such as accessing a web page, the enlargement of displayed characters is also sometimes required.

Generally the layout of a web page is arbitrarily changed in accordance with the size of the window or of the font that is used. Thus, when displaying a web page, if a user who has difficulty in reading a standard font set uses one that he or she finds suitable, the layout of the web page may be destroyed.

Further, since the layout of a commercially provided web page also contributes to the information the page is designed to present, in order to prevent the deterioration of the layout a fixed display dimension, the width for example, is designated. In this case, it is assumed that a standard font set will be used. And therefore, if a user who displays the web page uses a font size that he or she finds suitable, the layout of the web page will be distorted, in the direction in which the layout was not fixed.

When line space or character space is extended so that it becomes easier to read than that used for the original configuration provided for a web page (i.e., the configuration designated by the creator of the web page), deterioration of the web page layout will also occur.

When merely one factor of a web page display configuration, such as the character font size or the line spacing or character spacing, is changed, deterioration of the web page layout occurs, and the information the original web page layout was intended to convey to a user will be lost. And further, line feed will be inappropriately inserted, and the document will not be easy to read. In addition, since the area for the display of the web page will be extended when the font size or the line spacing is increased, viewing the web page in its entirety will be inconvenient because more scroll operations are needed than that required for the original web page. Similarly, when the display width of the layout is fixed, the web page will be distorted and extended vertically, and again, to view the entire page more scroll operations are needed than that required for the original web page.

A technique is required whereby displayed characters can be enlarged while the original layout of a web page is preserved. For this purpose, conventional methods for enlarging a display screen and for employing a magnification tool have been proposed.

According to the display screen enlarging method, a display screen is divided into two areas: a normal display area and an area in which a designated range can be enlarged by using a mouse cursor for a bit-mapping process. Using this method, a large area can be enlarged and viewed at one time.

According to the method for employing the magnification tool, a small area (called a magnification area) that functions like a magnifying glass is dragged across a screen using an extension button, and the contents of a portion of the display screen within the magnification area are displayed as an enlarged bit map. Using this method, a user can view the contents of the entire display screen without altering the point of view.

Problems to be Solved by the Invention

In the prior art, since the method used for an enlarged display specifies that a display screen be divided into two areas, the area which can be seen at one time becomes small. Further, since the same contents are displayed in two screen locations, the normal display area and the magnifying display area, the user must view the contents of the display while dividing his or her attention between the two areas. Therefore, this is not always an easy and convenient method.

Further, since with the method for which the magnification tool is used only the data in a designated small area are magnified, the area within which magnified data are displayed is narrow. And if the size of the magnification area is increased, a portion hidden by the magnification area is expanded, and viewing the contents of an original display screen is difficult. That is, since with the conventional techniques only one part on a display screen is enlarged, it is difficult to obtain an overview of the data and to understand the contents.

SUMMARY OF THE INVENTION

In order to resolve the above shortcomings, it is one aspect of the present invention to display the contents of a document using a selected display condition, such as a desired font size or a desired line space or character space, while preserving the layout of the document.

It is another aspect of the present invention to edit the contents of the document, when it is enlarged and displayed, so that important information in the document survives.

To achieve the above aspects of the invention, an information processing system comprises: document display means for displaying a document having a predetermined layout; and display control means for controlling a method used by the document display means to display the document. The display control means include a layout structure analyzer for analyzing the structure of the layout of the document, a region arrangement determiner for dividing a web page, under a desired display condition whereby the contents of the page are displayed, in order to display the document in accordance with regions that are allocated and that reflect the structure of the document layout that is obtained by the layout structure analyzer, and an intra-region contents determiner for determining which contents of the document are to be displayed inside each of the allocated regions that are determined by the region arrangement determiner.

BRIEF DESCRIPTION OF THE DRAWINGS

FIG. 29 is a diagram for explaining the arrangement whereby a web server carries out a document editing function.

DESCRIPTION OF THE SYMBOLS

Figure 1:
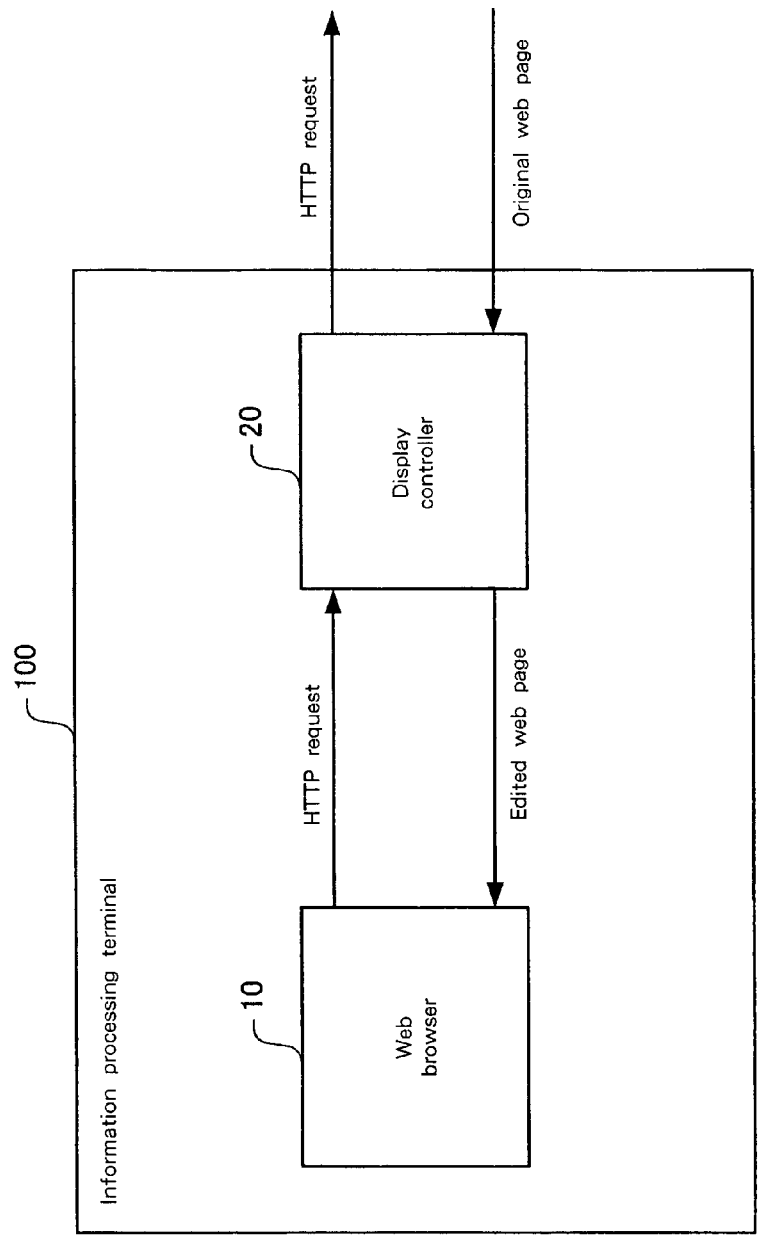
FIG. 1 is a diagram for explaining an overall arrangement of an information processing terminal that comprises a display controller 20 according to one embodiment of the present invention.

10: Web browser
20: Display controller
21: Layout structure analyzer
22: Region arrangement determiner
23: Intra-region contents determiner
100: Information processing terminal
200: Web server
300: Proxy server

DETAILED DESCRIPTION OF THE INVENTION

The present invention provides means to display the contents of a document using a selected display condition, such as a desired font size or a desired line space or character space, while preserving the layout of the document. It also provides for editing the contents of the document, when it is enlarged and displayed, so that important information in the document survives.

The invention employs an information processing system which in an example embodiment comprises: a display or document display means for displaying a document having a predetermined layout; and a display controller or a display control means for controlling a method used by the document display means to display the document. The display controller includes a layout structure analyzer for analyzing the structure of the layout of the document, a region arrangement determiner for dividing a web page, under a desired display condition whereby the contents of the page are displayed, in order to display the document in accordance with regions that are allocated and that reflect the structure of the document layout that is obtained by the layout structure analyzer, and an intra-region contents determiner for determining which contents of the document are to be displayed inside each of the allocated regions that are determined by the region arrangement determiner.

The document display means can be selected in accordance with the data form of a document. For a web page (HTML document), for example, the document display means is a web browser, and for a document created by a word processor, the document display means is display means provided by the pertinent application program. Further, any form can be employed as the display control means so long as it can function as the layout structure analyzer, the region arrangement determiner, and the intra-region contents determiner. Therefore, the display control may be mounted as a local proxy that is resident in the client machine of a user, or may be mounted as a plug-in to provide an additional function for a web browser. Furthermore, the display control means may also be provided for a network as a proxy server.

As the display condition, the font size of characters, or line or character spacing can be designated. That is, while the structure of the layout for the document is preserved by using the assigned region, the font size of the characters, or the line or the character spacing that is designated is reflected, and the contents of the document are displayed for each assigned region. In this case, when the font size or the line spacing is increased, all the original contents may not be displayed in the assigned region. Therefore, the intra-region contents determiner determines which contents are to be displayed, so that important data remain on the screen.

The layout structure analyzer of the display control means detects the type of delimiter used in each portion of a document for determining the document's layout, and employs the portions of the document as nodes for generating, as the structure of the layout for the document, a tree structure wherein the strength of the delimiters are hierarchically recorded. This arrangement is advantageous in that the logical structure of the layout for a document can be precisely extracted as a hierarchical structure.

The region arrangement determiner ascertains, as assigned regions for dividing a page in order to display it, regions that satisfy a predetermined rule concerning the layout of the document structure and that preserve portions, corresponding to each of the nodes in the tree structure, that are large enough to display at least one part of the contents of the document using characters that match a desired display condition. This arrangement is excellent because the logical structure of the layout for the document can be preserved as faithfully as possible. Further, since the predetermined rule concerning the structure of the layout is appropriately set, the sizes and the positional relationships of the assigned regions can be controlled.

Generally, when the sizes of assigned regions are reduced, the layout of a web page more closely approximates that of the original; however, important data provided on the original page tends to be lost. But when the sizes of the assigned regions are increased, although the amount of important data that is retained is increased, the layout is further removed from that of the original. Thus, the sizes and the positions of the assigned regions are controlled so as to maintain a balance between the preservation of the structure of the layout for the document and the loss of important data.

The intra-region contents determiner designates a priority order for control information for controlling the style of a document, and in accordance with the priority order, determines for each portion of the document, the contents that are to be displayed in a corresponding assigned region. This arrangement is particularly superior, as important information is not erased, even when not all the original data can be displayed in an assigned region because enlarged characters are employed.

The information processing system further comprises: detailed contents display means for displaying, separately from the contents selected by the intra-region contents determiner, the contents of a portion that corresponds to the location of an assigned region that is determined by the region arrangement determiner of the display control means. This arrangement is advantageous because erased information can be obtained, even though not all of a document can be displayed in assigned regions because characters are enlarged. To display the detailed contents, a mouse, for example, is used to select a desired assigned region, and all the contents in the assigned region are displayed. This method of displaying information associated with a designated area can be carried out using a well known technique.

The information processing system further comprises: detailed contents reading means for using speech synthesis to output the contents of the portions of the document corresponding to the locations in the assigned regions that are determined by the region arrangement determiner of the display control means. This arrangement is advantageous because erased information can be obtained using speech when not all of the document can be displayed in the assigned regions because the characters have been enlarged. Further, the contents in a desired assigned region can be obtained by using speech, without hiding the displayed document with another display. This method for the oral output of the information associated with a designated area can be implemented using a well known technique.

Further, according to the present invention, provided is an information processing system for displaying a document, which has a predetermined layout, wherein the structure of the layout for the document is extracted as a combination of several areas; wherein the size of the characters in the font used in the area is increased while the sizes and the locations of the areas are substantially preserved; and wherein the characters included in the areas are selectively displayed in accordance with a predetermined condition. This arrangement is superior because the characters are enlarged and displayed while preserving the layout, and an abstract of the document is created and displayed under a predetermined condition. Thus, the important information is not erased and is displayed, even when the characters are enlarged. The condition may be a priority listing, or a detailing of the degrees of importance that may be assigned by assuming the intent of a document creator or that may be mechanically assigned based on an original font size or on whether a highlighting style, such as bold, italics or underlining, has been set.

In accordance with the above described condition, the characters included in the individual areas can be selectively displayed, not only for increasing the font size, but also for extending the line spacing or the character spacing.

Furthermore, according to the present invention, a proxy server, which is located between a web server and a client terminal and which performs a predetermined process for a web page received from the web server, and transmits the resultant web page to the client terminal, comprises: a layout structure analyzer for analyzing the structure of the layout for the web page received from the web server; a region arrangement determiner for, when the contents of the web page are displayed under a desired display condition, dividing the web page into regions that are allocated to reflect the structure of the web page layout that is obtained by the layout structure analyzer; and an intra-region contents determiner for determining the contents of the document to be displayed inside each of the allocated regions that are determined by the region arrangement determiner. Since the proxy server is provided, the display of a web page can be controlled without special configurations being required for the information processing system and the web server.

The layout structure analyzer defines the level of a delimiter for style information that is used to display the web page using a browser, and defines the layout of the web page, detects the level of the delimiter in the style information that is written in the web page received from the web server, regards, as nodes, the individual portions of the web page that are separated in accordance with the style information, and generates, as a structure for the web page layout, a tree structure with which the level of the delimiter for each of the nodes is reflected hierarchically. This arrangement is advantageous because the logical structure of the layout for the web page can be precisely extracted as a hierarchical structure.

According to the present invention, a web page display control method for controlling the display of a web page using a browser, comprises: a web page layout structure analyzation step of analyzing the structure of the layout for the web page; a web page division step of, when the contents of the web page are displayed under a desired display condition, dividing the web page into regions that are allocated to reflect the structure of the layout of the web page that is obtained at the web page layout structure analyzation step; a web page contents determination step of determining the contents of the web page that are to be displayed inside each of the allocated regions determined at the web page division step; and a web page contents display step of arranging, in a window for displaying the web page, the assigned regions determined at the web page division step, and displaying the contents of the web page that are determined at the web page contents determination step. The algorithm can be performed by, for example, embedding it using a script, such as the JavaScript in an HTML document that constitutes a web page. The algorithm can also be performed by embedding a Java applet as an object.

The web page layout structure analyzation step includes the steps of: employing the style information written on the web page to extract a first tree structure wherein portions of the document that are separated in accordance with the style information are defined as nodes; and ranking each of the nodes of the first tree structure based on the level of the delimiter that is predetermined for the style information, and generating a second tree structure wherein a node that corresponds to the style information having the highest level of delimiter is employed as a root node and the level of the delimiter is reflected. With this arrangement, the tree structure generated based on the style information can be appropriately rearranged to provide a tree structure that reflects the structure of the layout for the web page. When there are a plurality of nodes in the first tree structure that correspond to the style information having the highest level of delimiter, the root node is determined in accordance with an appropriate rule. Generally, it is preferable that a node of the highest level that appears first on the web page be determined as the root node.

At the step of dividing the web page, beginning with the root node in the second tree structure, a process is performed to determine whether, under a desired display condition, at least a part of the contents of a portion specified by the node of the web page can be displayed at the location of the portion. When the contents can be displayed, the process is recursively performed with the child nodes of the node. When no contents can be displayed, the web page is divided by using an assigned region that is positioned at the same location and has the same size as the portion specified by the last node whose contents are displayed. This arrangement is advantageous in that an assigned region can be set with which the logical structure of the layout for the document can be preserved as faithfully as possible. Further, in order to balance the preservation of the structure of the layout for the document and the maintenance of the important information contained in the document, a selective condition may be provided to halt the recursive execution of the process for determining whether the display is enabled. The selective condition may be the size of an assigned region, or a rule for controlling the positional relationships of the assigned regions.

The web page display control method of the invention further comprises the step of: receiving a request designating an assigned region that is determined at the web page division step performed following the web page contents display step, and displaying the contents of a portion of the web page that the assigned region contains. This arrangement is advantageous because when not all the original contents can be displayed in the assigned region due to the enlargement of the characters, the missing information can be obtained.

According to the present invention, the following web page display control method is provided for using a browser to control the display of a web page. Specifically, the web page display control method comprises the steps of: extracting the structure of the layout for the web page as a combination of several areas; increasing the font size of the characters included in the areas, while the sizes and locations of the areas are substantially preserved; and displaying as many as possible of the characters included in the areas in accordance with a condition defined for HTML tags. This arrangement is superior because while the characters are enlarged and displayed, the layout is preserved, and an abstract of the document is created and displayed based on a predetermined condition. Thus, important information can be displayed without any being lost, even though the characters are enlarged. The condition may be a priority listing or a detailing of the degrees of importance that may be assigned by assuming the intent of a document creator or that may be mechanically assigned based on an original font size or on whether a highlighting style, such as bold, italics or underlining, has been set.

In accordance with the above described condition, the contents included in the individual areas can be selectively displayed, not only for increasing the font size, but also for extending line spacing or character spacing.

Further, according to the present invention, provided is a storage medium on which a computer-readable program is stored by input means provided for a computer, the computer readable program permitting the computer to perform: a web page layout structure analyzation process for analyzing the structure of the layout for the web page; a web page division process for, when the contents of the web page are displayed under a desired display condition, dividing the web page into regions that are allocated to reflect the structure of the layout of the web page that is obtained in the web page layout structure analyzation process; and a web page contents determination process for, in order to display the web page using a browser, determining the contents of the web page that are to be displayed inside each of the allocated regions determined in the web page division process. With this arrangement, a computer into which the program is loaded can control a web browser, so that, while the layout structure is preserved, the font size used for characters and the line spacing used for the web page can be changed, and the resultant web page displayed.

In addition, according to the present invention, provided is a storage medium on which a computer-readable program is stored by input means provided for a computer, the computer readable program permitting the computer to perform: a web page layout structure analyzation process for analyzing the structure of the layout for the web page; a web page division process for, when the contents of the web page are displayed under a desired display condition, dividing the web page into regions that are allocated to reflect the structure of the layout of the web page that is obtained in the web page layout structure analyzation process; a web page contents determination process for determining the contents of the web page that are to be displayed inside each of the allocated regions determined in the web page division process; and a web page contents display process for arranging, in a window for displaying the web page, the assigned regions determined in the web page division process; and a web page display process for displaying the contents of the web page that are determined in the web page contents determination process. With this arrangement, a computer into which the program is loaded can control a web browser, so that, while the layout structure is preserved, the font size used for characters and the line spacing used for the web page can be changed, and the resultant web page displayed.

A program transmission apparatus comprises: storage means for storing a program that permits a computer to perform a web page layout structure analyzation process for analyzing the structure of the layout for the web page, a web page division process for, when the contents of the web page are displayed under a desired display condition, dividing the web page into regions that are allocated to reflect the structure of the layout of the web page that is obtained in the web page layout structure analyzation process, and a web page contents determination process for, in order to display the web page using a browser, determining the contents of the web page that are to be displayed inside each of the allocated regions determined in the web page division process; and transmission means for reading the program from the storage means and for transmitting the program. The program transmission apparatus can provide the technique of the present invention for a client, without a storage medium, such as a CD-ROM, being required as a program provision form.

The storage means stores a web page that includes the program as an embedded script or object. When the program transmission apparatus transmits the web page, together with an application for executing the script or the object, an apparatus that downloads the web page can control the way the web page is displayed, without requiring a special configuration.

EXAMPLE EMBODIMENT

The present invention will now be described in detail by referring to example embodiments shown in the accompanying drawings.

FIG. 1 is a block diagram illustrating an information processing terminal that includes a document display control function according to the embodiment of the present invention. The display control function of this invention can be provided in various forms, such as by mounting it on the information processing terminal, as is shown in FIG. 1, or by providing it as a function of a proxy server accessible across a network. In the arrangement of this embodiment, the information processing terminal includes a display controller for controlling the display of a document. The other examples will be described later. Further, in the embodiment, a web page is to be processed, and to control the display of a web page (HTML document), a web browser is used.

In FIG. 1, an information processing terminal 100 comprises a web browser 10 for displaying a web page, and a display controller 20 for controlling the display of the web page by the web browser 10. The information processing terminal 100 also comprises a communication unit (not shown) that is connected to a communication network, such as the Internet, and that issues requests to a web server and obtains a web page.

The web browser 10, via the web server, downloads through the communication unit (not shown) a web page that it thereafter displays. The web browser 10 can be a common web browser, such as the Netscape navigator by Netscape Communications Corp. or the Internet explorer by Microsoft Corp.

The display controller 20 controls the display of the web page by the web browser 10. Specifically, the elements, such as characters and images, that constitute the web page are displayed based on a display condition designated by a user, regardless of the original display condition provided for the pertinent web page, i.e., the display condition designated by the producer of the pertinent web page. The display condition here includes the font size, the line spacing or the character spacing. To display the web page, the web page is divided into several blocks, the locations and the sizes of the blocks are fixed, and only the display condition of the elements is changed. As a result, there is no deterioration of the layout of the web page.

The display controller 20 is primarily intended for use by elderly persons, or visually impaired persons for whom reading original-font sized characters on a web page is difficult. The display controller 20 uses a large font size, designated by one of the above described users, to display a web page that the user can easily read. In this case, since even when enlarged characters are displayed there is no deterioration of the overall layout of the web page, the user can apprehend the design of the web page at a glance. In certain cases wherein enlarged characters are used for displays, parts of documents can not be shown because the original web page layouts are maintained. In these cases, in order to prevent the erasure of important portions of documents, abstracts of the contents of the web pages are prepared. In this embodiment, the contents of a document are weighted by using HTML tags, and to prepare an abstract, important portions are retained based on their weighted values.

Figure 2:
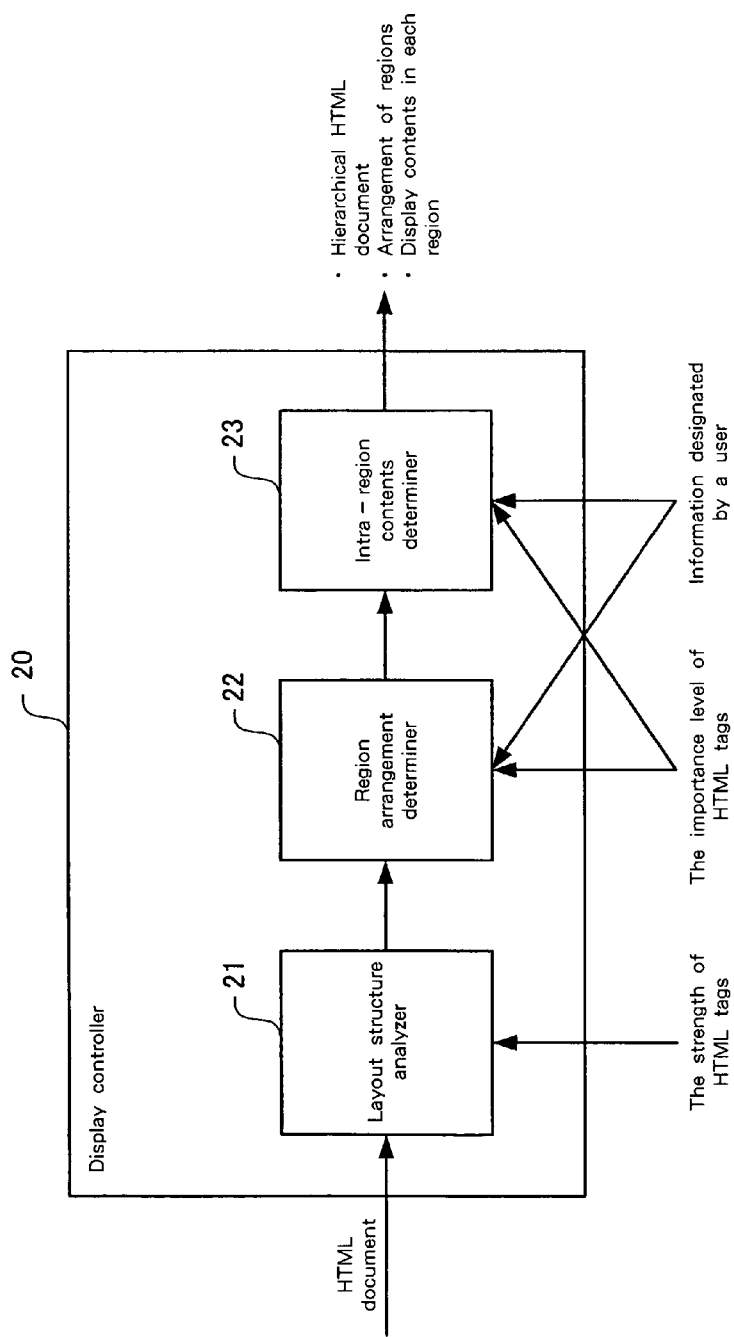
FIG. 2 is a diagram for explaining an arrangement of the display controller 20 of the embodiment.

FIG. 2 is a block diagram illustrating the arrangement of the display controller 20. In FIG. 2, the display controller 20 includes: a layout structure analyzer 21 for analyzing the structure of the layout for the web page; a region arrangement determiner 22 for designating assigned regions that reflect the layout structure obtained by the layout structure analyzer 21 and for dividing a web page into regions; and an intra-region contents determiner 23 for determining the contents to be displayed in each of the assigned regions that are determined by the region arrangement determiner 22.

The layout structure analyzer 21 divides the web page into several portions, and employs the positional relationships of these portions to generate a tree structure that is equivalent to the structure of the layout for the web page. A specific method for this will be explained by employing an HTML document as a processing target, and by using HTML tags as an example for the analyzation of the structure of the layout for the web page.

HTML tags are employed to write control information in an HTML document. As the HTML tags used for an HTML document, there are tags called block level elements, which are used to define a rectangular area on a screen for controlling a display or a logical structure, and tags called inline elements (or text level elements), which are used to modify contents, regardless of the size of a rectangular area. Since an area designated by the block level elements is shaped like a rectangle, an HTML tag belonging to the block level elements accompanies a line feed when it is displayed by the web browser 10, whereas an HTML tag belonging to the inline elements does not accompany a line feed when it is displayed by the web browser 10. Example block level elements are tags <H1> and <H2>, which represent a heading, and a tag <P>, which represents a paragraph. Example inline elements are a tag <B>, which is used to designate bold for text, and a tag <FONT>, which is used to designate a font.

Figure 3:
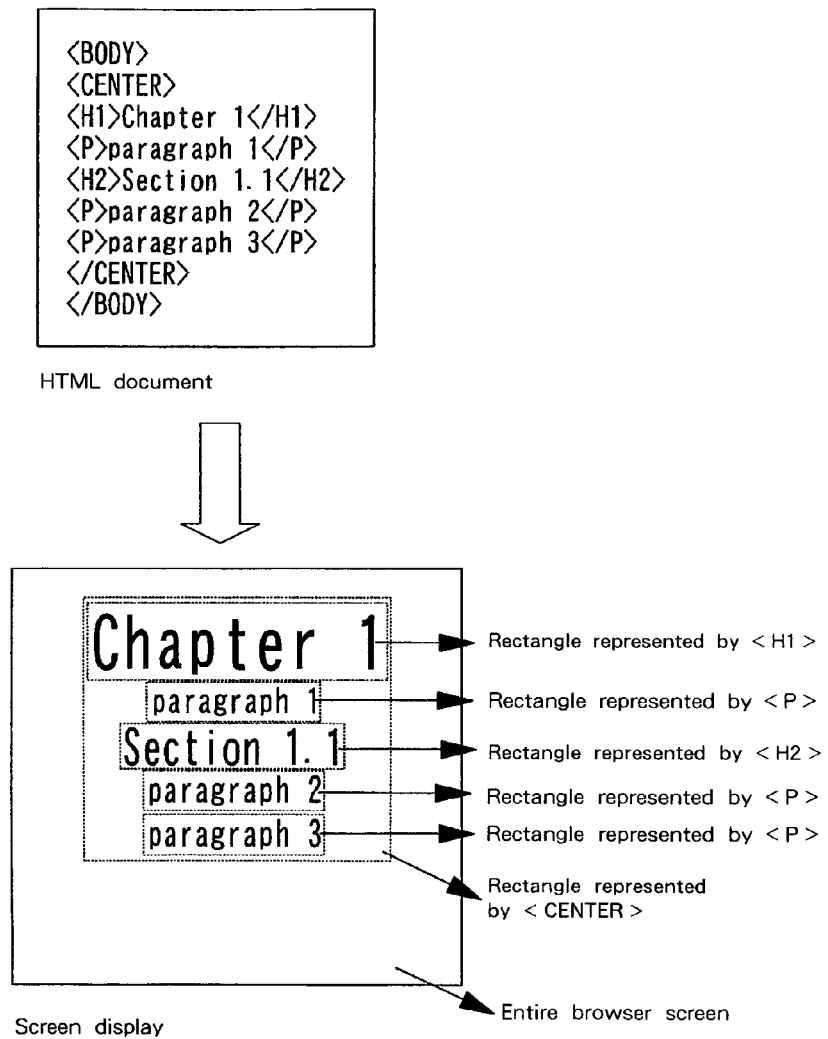
FIG. 3 is a diagram showing a source list for an HTML document in which HTML tags are written and an example display of the HTML document.

FIG. 3 is a diagram showing a source list for an HTML document in which HTML tags are entered, and an example display for the HTML document. In FIG. 3, a centering tag <CENTER>, which controls the overall display contents of the HTML document, is present in a tag <BODY> that holds the display contents of the HTML document, and a document is written by dividing it into segments using tags <H1> and <H2>, which represent headings, and a tag <P>, which represents a paragraph. In addition, as is shown in FIG. 3, each HTML tag has its own rectangular area (a portion enclosed by a broken line) when the HTML document is displayed by the web browser 10. This rectangular area is a range within which control is exercised using the pertinent HTML tag, and its contour is not displayed when the HTML document is actually displayed by the web browser 10. When, like the relationship of the <CENTER> and the <H1> tags, a range delimited by predetermined tags includes another tag, the rectangular areas of the tags also have the same relationship. The rectangular areas of nodes having a common parent (sibling nodes) are adjacent to each other.

Figure 5:
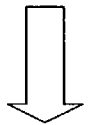
FIG. 5 is a diagram showing a source list for another HTML document in which HTML tags are written and an example display of the HTML document.

FIG. 5 is a diagram showing a source list for another HTML document, and an example display for the HTML document. In this example, a tag <I>, by which italics is designated for text, a tag <B>, by which bold is designated, and a tag <BIG>, which designates a font size larger than the standard, are inline elements. Therefore, for these tags, inherent rectangular areas are not shown on the display screen.

Figure 4:
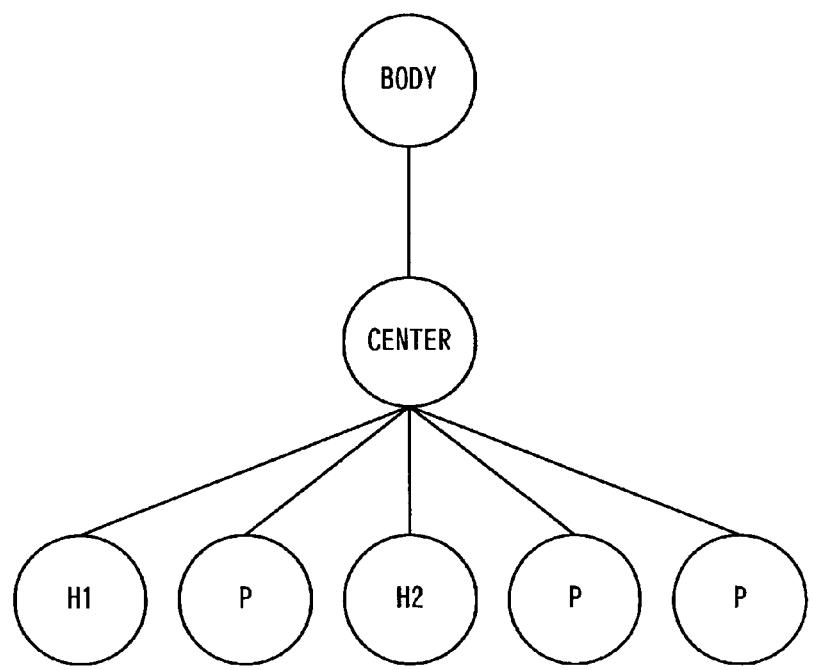
FIG. 4 is a diagram showing a tree structure that is generated by using, as nodes, the HTML tags of the HTML document in FIG. 3.
Figure 6:
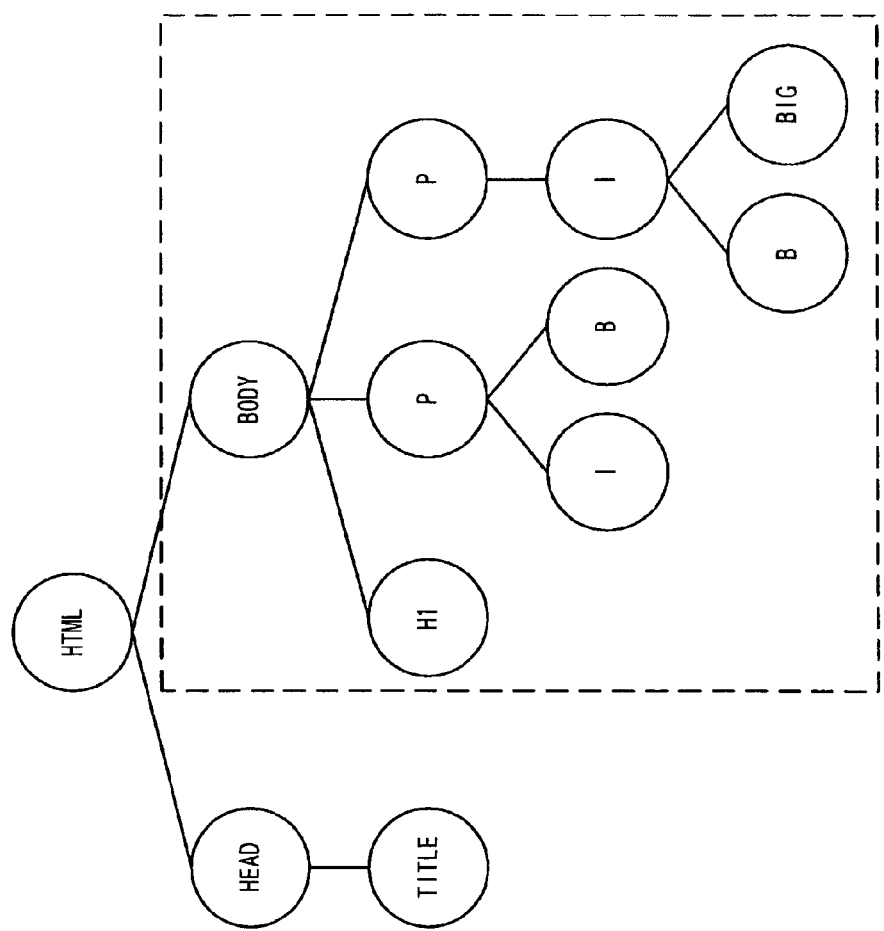
FIG. 6 is a diagram showing a tree structure that is generated by using, as nodes, the HTML tags of the HTML document in FIG. 5.

When an HTML tag is defined as a node, the control structure for the style of the HTML document can be represented by using a tree. The tree structure shown in FIG. 4 is generated by employing as nodes the HTML tags of the HTML document in FIG. 3, while the tree structure shown in FIG. 6 is generated by employing as nodes the HTML tags of the HTML document in FIG. 5. Identification information for an HTML tag, the strength of the HTML tag, which will be described later, the importance level of the HTML tag, which will also be described later, and the location and the size of a rectangular area for the HTML tag are stored in a corresponding node, which is a block level element in a tree. Further, the importance level of an HTML tag that will be described later is stored in a corresponding node, an inline element. As is described above, to set a predetermined area, such as a paragraph an HTML tag that belongs to the block level elements specifies the layout of an HTML document. Therefore, a tree structure that is generated using the HTML tags as nodes, reflects, to a degree, the structure of the layout for the HTML document.

The DOM tree (Document Object Model tree) for which w3c (world wide web consortium) is determined to be the standard, can be employed for the Internet explorer and other well-known web browsers in order to generate as nodes the tree structure that employs the HTML tags. Since the web browser 10 that employs the DOM tree automatically converts the HTML document into the tree, the obtained tree structure is merely be fetched by the layout structure analyzer 21. It should be noted, however, that a browser that can not employ a DOM tree can generate the same tree structure in accordance with the relationships between the HTML tags.

Next, in order to make an assumption as to the structure of the layout for an HTML document intended by a web page creator, the tree structure that is generated using the HTML tags as nodes is modified. In the examples in FIGS. 5 and 6, only a node that corresponds to the tag <BODY> and a lower node are modified as portions that concern the structure of the layout for the document.

Figure 7:
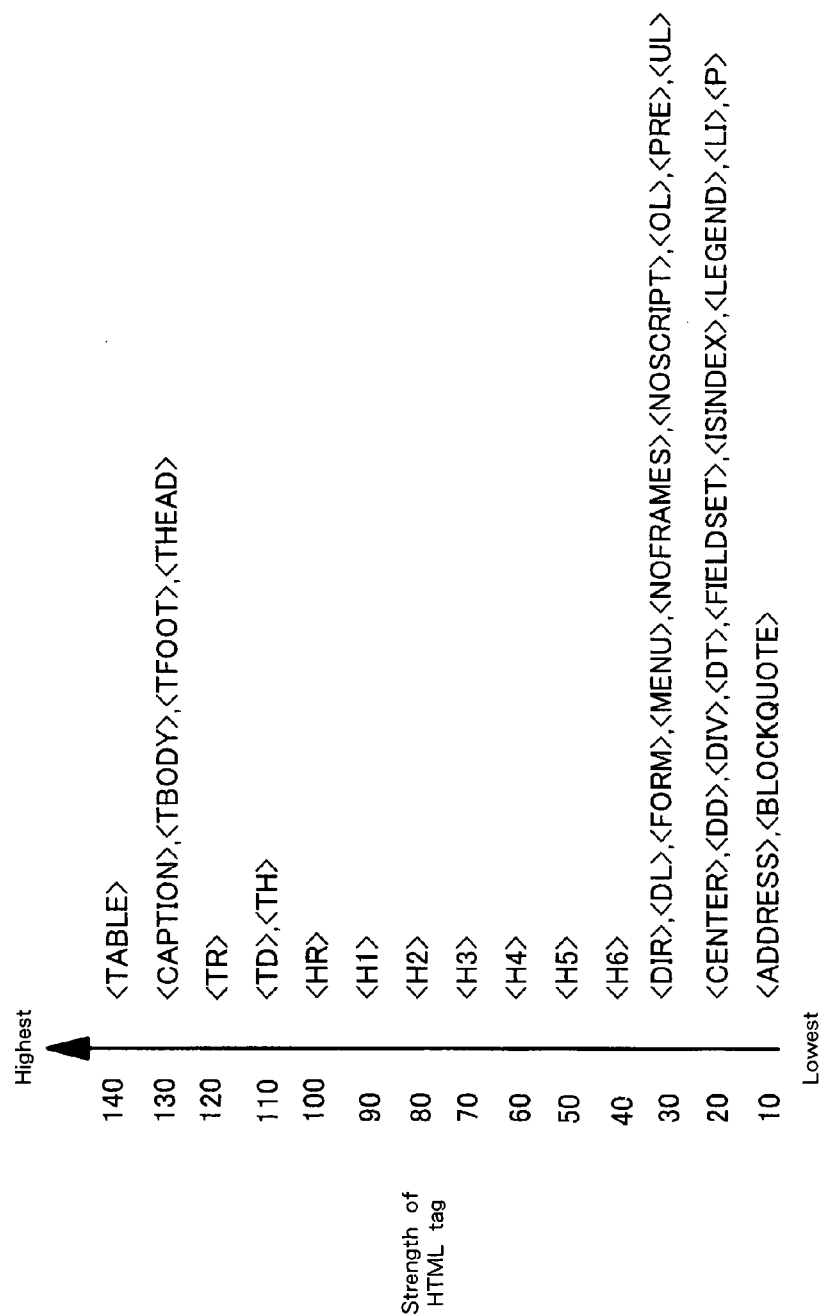
FIG. 7 is a diagram for explaining the strengths of the HTML tags.

First, the level of the delimiter for a document (hereinafter referred to as the strength of the HTML tag) is set for an HTML tag that is one of the block level elements. The process by which the level is set is not performed each time a web page is read; the setting is stored in advance as a data file in a storage device (not shown), and each time the web page is read by a display controller 20, the data file is supplied from the layout structure analyzer 21. FIG. 7 is a diagram showing the strengths of the HTML tags. In this example, a tag <TABLE>, which represents a complete table, is stronger than a tag <TD>, which represents only one cell in a table. This means that the delimiter between the inside and the outside of the table is stronger than the delimiter between a predetermined cell in the table and an adjacent cell. It should be noted that the strength of the HTML tag and its value are merely examples. The relationship of the strengths of the HTML tags and their values can be changed as needed to precisely reflect the intent of a web page creator. Further, the HTML tags can be changed by revising the HTML, and accordingly, the definitions of the strengths attributed to the HTML tags should be appropriately updated.

While referring to a flowchart in FIG. 8, and diagrams in FIGS. 9 to 12 for explaining the state, the processing for changing a tree structure that is generated by using HTML tags as nodes will now be described by employing the strengths of the HTML tags set as in FIG. 7. FIGS. 9 to 12 are diagrams showing the structure of the layout for a document in a web page, and a tree that reflects the structure of the layout. In order to extract the structure of the layout for the document, nodes that are located beneath the node that corresponds to the table <BODY>, and that correspond to the HTML tags whose strengths are defined as is shown in FIG. 7, are arranged in the tree structure that is generated by using the HTML tags as nodes, and the tree structure is re-constructed based on the strengths of the HTML tags. For the tree structure in FIGS. 9 to 12, a rectangle is used to display a leaf node (the topmost location in the drawings). The heights of the individual rectangles represent the relationships of the strengths assigned to the HTML tags. In addition, entries, such as chapter 1 and section 1, above the nodes are the contents of the document that is controlled by the HTML tags that correspond to the nodes. Since the contents of the document that are controlled (paragraphed)

by the tag <P> form paragraphs, and are sentences having specific lengths, they are not shown in the drawings.

Figure 8:
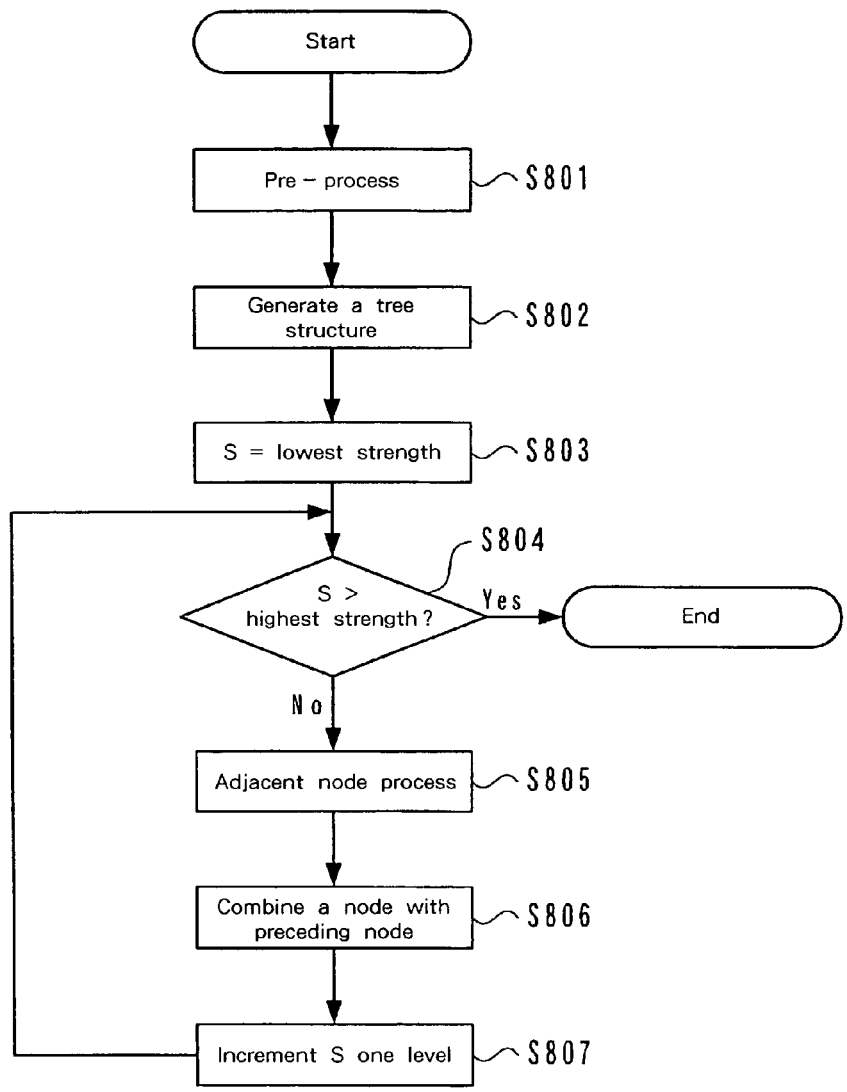
FIG. 8 is a flowchart for explaining the processing performed by a layout structure analyzer 21 to modify a tree structure that is generated using HTML tags as nodes.

The pre-process at step 801 in FIG. 8 is a preparation process, including a process for the removal of a comment. An HTML grammar error, such as an end tag having no start tag or an empty block level element, and a process for enclosing a child node of <BODY>, which is not a block level element, with <P> and </P>. The process at step 802 for preparing the tree structure is a process for generating a tree structure for which the HTML tags are used as nodes.

Figure 9:
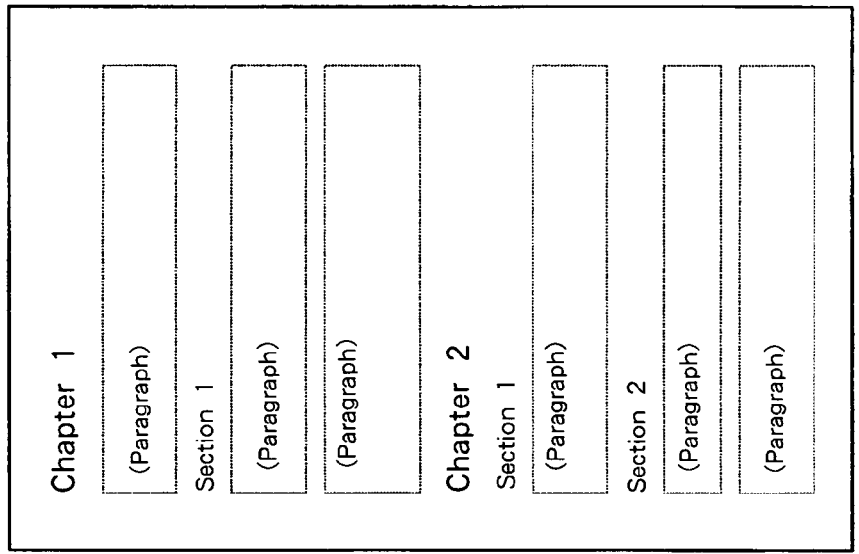
FIG. 9 is a diagram showing a layout structure of a web page and a tree that reflects the layout structure, both of which are in the initial state wherein the levels that reflect the strengths of the HTML tags are not extracted.
Figure 9:
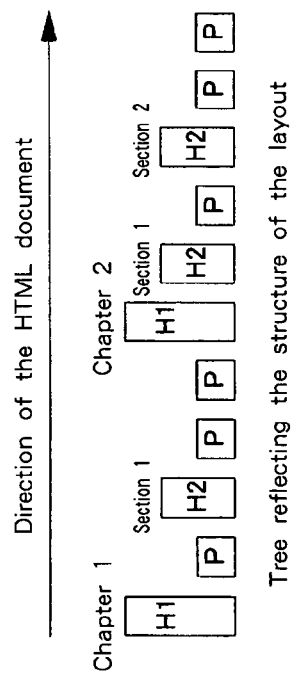

Through this processing, the state shown in FIG. 9 is obtained. In FIG. 9 at this time, in a display area there is no hierarchical structure that is represented by HTML document sibling nodes (nodes having the same parent).

A parameter S is set as a variable that represents the strength of a target HTML tag. The HTML tag in FIG. 7 having the smallest strength value (the value of the weakest HTML tag) is assigned to the parameter S (step 803). Thus, of the HTML tags that are present in the target HTML document, the HTML tag having the smallest strength is to be processed. When there are a plurality of HTML tags having the same strength, all of them are processing targets.

Subsequently, a check is performed to determine whether the value of the parameter S exceeds the maximum value of strengths of the HTML tags included in the HTML document. Were the value of the parameter S to exceed the maximum value (decision is YES), the processing would be terminated (step 804), but since at this time the decision is NO, program control advances to step 805.

Then, the obtained tree structure is scanned, as are all the portions lying adjacent to nodes for which the strength of the HTML tag is S. And as an adjacent node process, a new node that has as children adjacent nodes is generated for each of the portions (step 805). The new node has the same HTML tag strength as has the child nodes, and represents a rectangle on a web page, so that the rectangles of all the child nodes on the screen are included in the rectangle.

Figure 10:
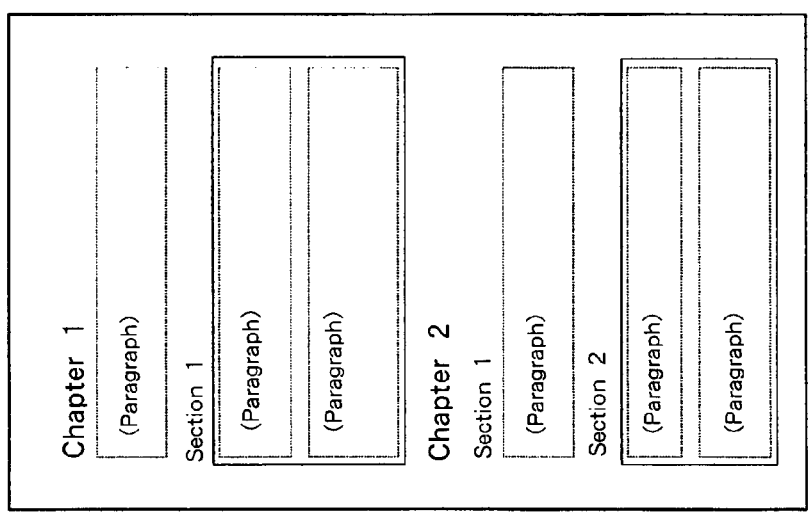
FIG. 10 is a diagram showing a layout structure of a web page and a tree that reflects the layout structure, both of which are in the state existing after an adjacent node process has been performed.
Figure 10:
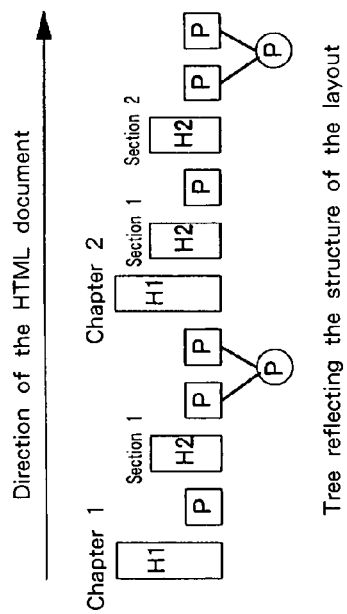

FIG. 10 is a diagram showing the state wherein, with the structure of the layout and the tree shown in FIG. 9, the adjacent node process is performed for a node that corresponds to <P> for which the strength of the HTML tag is the smallest. In FIG. 10, two adjacent <P> nodes are sandwiched between the node <H2>, which holds the contents of section 1, and the <H1> node, which holds the contents of chapter 2. And two adjacent <P> nodes are positioned following the node <H2> (on the right in FIG. 10), which holds the contents of the section 2. The adjacent node process is performed for these nodes, and a node that has each pair of the two <P> nodes as children and has the same strength as the <P> is generated above. In addition, when the structure of the layout for the web page is referred to, a paragraph that corresponds to the two adjacent nodes <P> is included in a large rectangle that corresponds to each of the new nodes.

Further, the tree structure is scanned, and the portion is detected whereat a node having the strength S of the HTML tag is adjacent to a node that is located nearer the head of the sentence (on the left in FIG. 10) and that has a greater strength then has the HTML tag. And a new node is created that has these nodes as children (step 806). The new node has the same HTML tag strength as has the child node that has the greatest HTML tag strength. On the web page, the new node represents a rectangle that includes the rectangles of all the child nodes on the screen.

Figure 11:
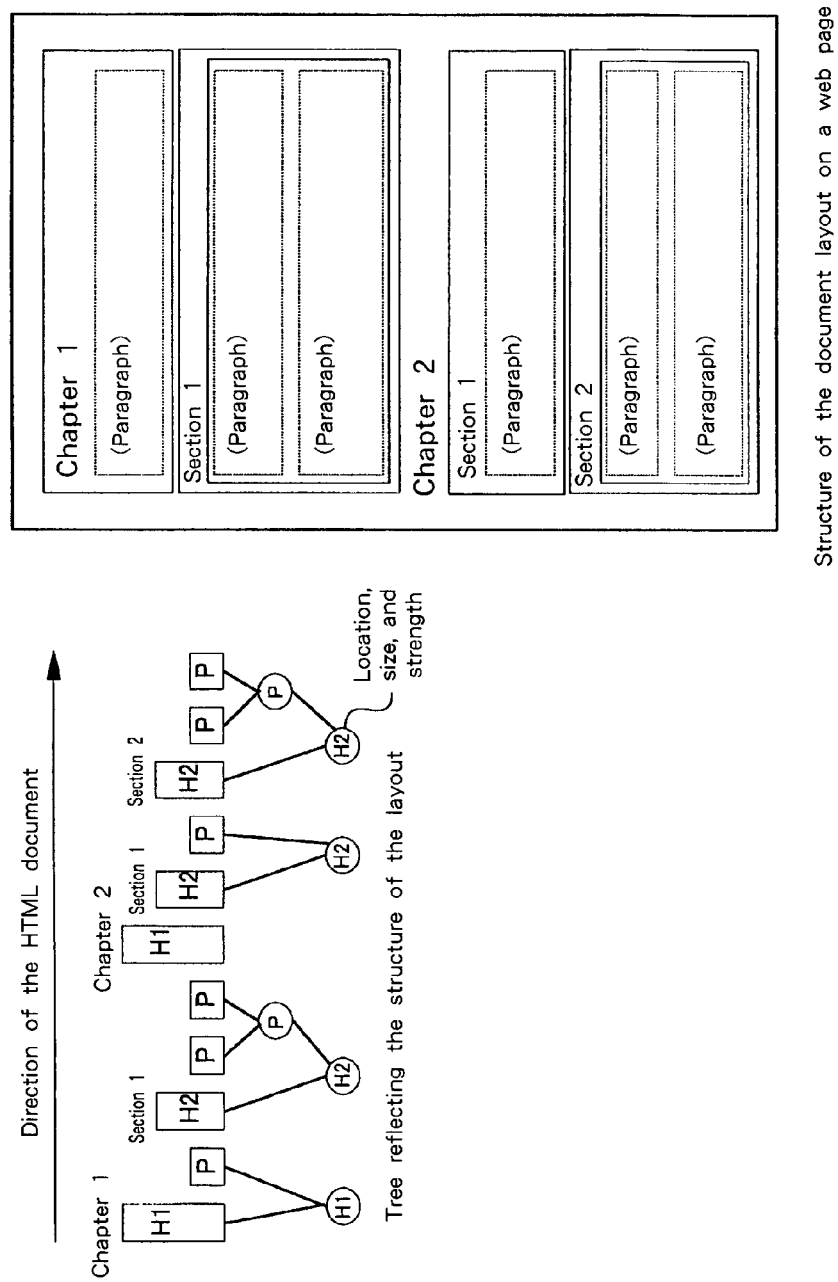
FIG. 11 is a diagram showing a layout structure of a web page and a tree that reflects the layout structure, both of which are in the state existing after a process is performed to combine a node having a weak HTML tag with a node having a strong HTML tag.

FIG. 11 is a diagram showing the state of the layout structure and the tree in FIG. 10 for which the above process has been performed. In FIG. 11, the node <P>, which is located second from the left, and the node <H1>, which is located at the head of the sentence and holds the contents of chapter 1, are combined together, and a node that has the same strength as the <H1> and has these nodes as child nodes is generated above. Similarly, the node <H2>, which holds the contents of section 1, and the succeeding node <P> are combined together to generate a node having the same strength as <H2>. Further, subsequently the node <H2>, which holds the contents of section 1, and the succeeding node <P> are combined together to generate a node <H2>. In addition, the node <H2>, which holds the contents of section 2, and the succeeding node <P> are combined together to generate a node <H2>. Since the node that has the strength S of the HTML tag (a node <P> or a node having the same strength as <P>) does not immediately follow the node <H1>, which holds the contents of chapter 2, a combining process is not performed. When the structure of the layout for the web page is referred to, the rectangles that correspond to the combined nodes are included in a large rectangle that corresponds to the new node.

A value obtained by incrementing a current value by one level is assigned to the parameter S (step 807), and beginning at step 804 the same process is then repeated. That is, the same process is performed for a node for which the strength of the HTML tag is higher by one level than is the preceding strength.

When the above process is repeated and the value of the parameter S exceeds the maximum value of the strengths of the HTML tags included in the HTML document that is currently being processed, the processing is terminated.

Figure 12:
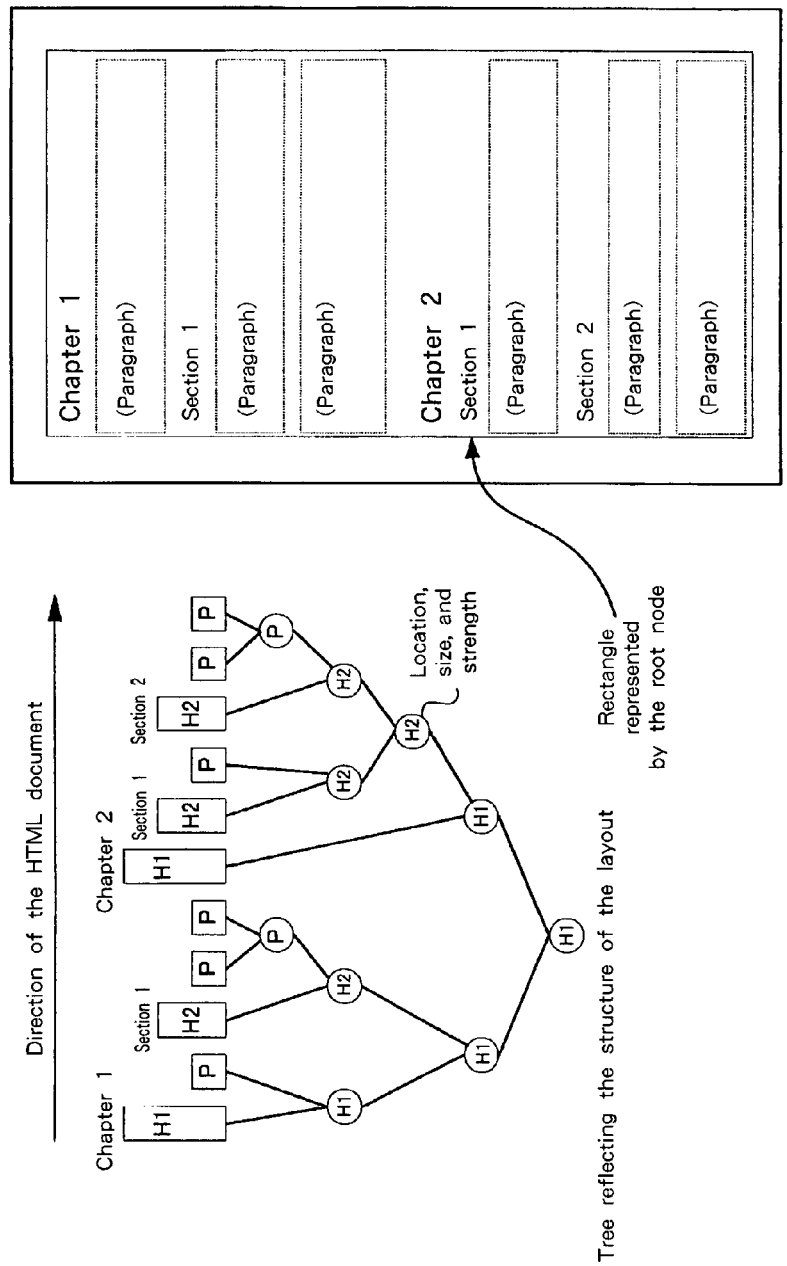
FIG. 12 is a diagram showing a layout structure of a web page and a tree that reflects the layout structure, both of which are finally obtained by the layout structure analyzer 21.

FIG. 12 is a diagram showing the structure and the layout for the tree obtained by repeating the above process for the structure and the layout for the tree in FIGS. 9 to 11. In FIG. 12, while the node having the same strength as <H1>, which includes the entire document and which is employed as a root node, a tree structure is generated wherein the strengths of the HTML tags of the individual nodes are reflected hierarchically. When the structure of the layout for the web page is referred to, the entire document is included in a rectangle that corresponds to the root node.

The region arrangement determiner 22 employs the tree structure that reflects the strength of the HTML tag that is generated by the layout structure analyzer 21, and generates assigned regions to determine the layout for the web page. Since the assigned regions are used to determine the layout for the web page, the regions that are arranged on the web page should not overlap, and should represent the entire screen of the original web page when they are collected together.

Since the nodes and the HTML tags in the document are correlated with each other in the tree structure generated by the layout structure analyzer 21, only the nodes need be selected to establish the above condition, so that the rectangular areas of the HTML tags for the individual nodes can be used as assigned regions. Therefore, when the tree structure is generated by the layout structure analyzer 21, all the nodes that constitute the tree structure can be those assigned regions that have been proposed. Then, the nodes are selected to establish the condition, and the assigned regions are determined.

If, to display the contents of the web page, a user designates a font size and a line space that are larger than those designated by a web page creator, all of the document that is controlled by the HTML tag can not be displayed within the rectangular area of the HTML tag. Thus, an assigned region should be large enough to permit the complete display in it of the most important information in the document, so that the user can easily apprehend the intent of the contents displayed in the pertinent assigned region. Therefore, nodes are selected that correspond to the HTML tags that have appropriately sized rectangle areas, while the hierarchical tree structure is traced down, beginning at the root node. That is, since in the tree structure the rectangle that the parent node represents on the screen includes all the rectangles that child nodes represent on the screen, the tracing of the tree structure from the parent to the children corresponds to the division of the rectangles on the screen.

Figure 13:
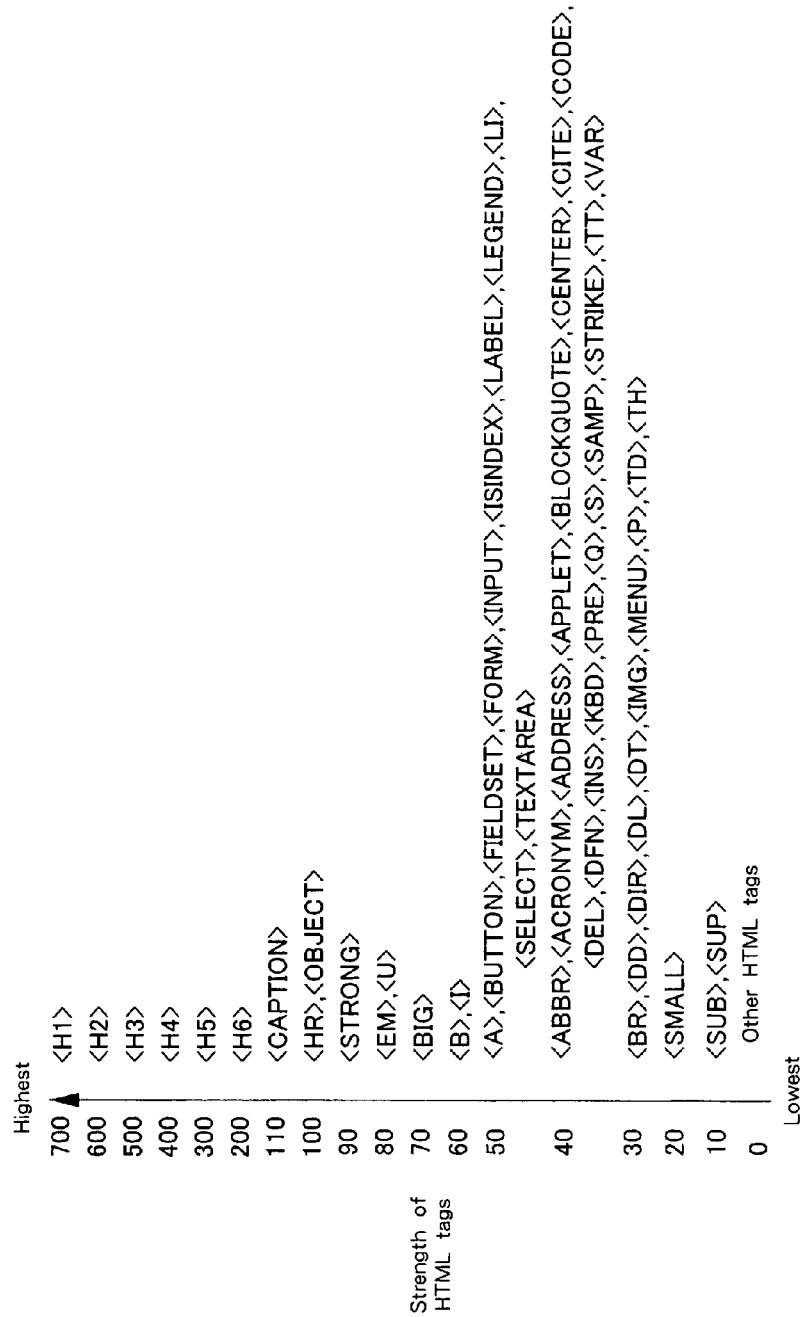
FIG. 13 is a diagram for explaining the importance levels of the HTML tags.

Furthermore, in order to specify the portion of a document to be displayed in the assigned region, the importance level (hereinafter referred to as the importance level of an HTML tag) is set for the HTML tags that are block level elements and inline elements. The importance level of an HTML tag represents the importance level of a document that is controlled by the HTML tag, and also represents the priority value to be displayed by the web browser 10. The process by which the level is set is not performed each time a web page is read; the setting is stored in advance as a data file in a storage device (not shown), and each time the web page is read by a display controller 20, the data file is supplied from the storage device. FIG. 13 is a diagram showing the importance level of the HTML tags. In this example, the tag <H1>, which represents the heading at the highest level, has the maximum importance level. This means that overall the contents indicated by <H1> are most important on the web page. It should be noted that the importance levels and the values of the HTML tags are merely examples, and are set based on the logical structure that is defined for the HTML tags and the style that is generally employed to indicate the important items in a document. Therefore, these importance levels and values can be changed as needed to precisely reflect the intent of a web page creator. Further, the HTML tags can be changed by revising the HTML, and accordingly, the definitions of the importance levels of the HTML tags should be appropriately updated.

Figure 14:
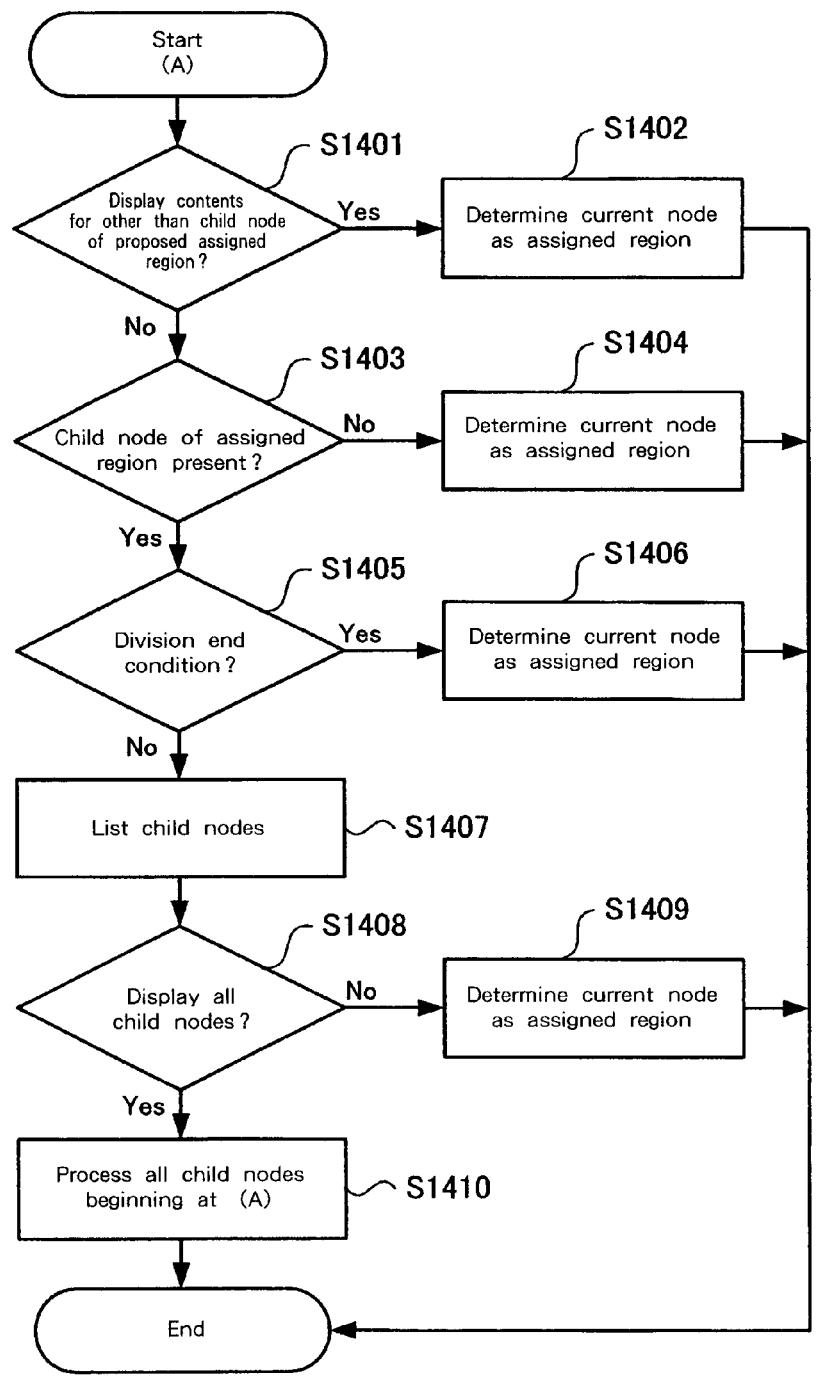
FIG. 14 is a flowchart for explaining the processing performed by the region arrangement determiner 22 to determine from a tree structure an assigned region that is generated by the layout structure analyzer 21.

While referring to the flowchart in FIG. 14 and to FIGS. 15 to 18 for explaining the state, an explanation will now be given for the processing performed by the region arrangement determiner 22 when determining the assigned regions using the tree structure that is generated by the layout structure analyzer 21. As is described above, the performance of this processing begins with a root node that overall corresponds to the screen of the web page, and then for child nodes is recursively performed by tracing down the tree structure. The shifting of the process to the child nodes corresponds to the division of the rectangle area of the parent node into the rectangular areas of the child nodes. The process performed for each node is shown in the flowchart in FIG. 14.

First, a check is performed to determine whether a target node, which is a proposed assigned region, has a child node that is not a proposed assigned region (step 1401). If the node has a child node that is not a proposed assigned region, it means that the total size of the rectangular areas of all of such child nodes is still smaller than the rectangular area of the target node. Therefore, in this case, further division is not performed, and the rectangular area of the target node is established as an assigned region (step 1402).

When the target node does not have a child node that is not a proposed assigned region, a check is performed to determine whether the target node has a child node that is a proposed assigned region (step 1403). If the target node does not have such a child node, further tracing of the tree structure toward the child nodes can not be performed, and the rectangular area of the target node is established as an assigned region (step 1404).

When the target node has a child node, a check is performed to determine whether the target node matches a predetermined division end condition (step 1405). The division end condition is a determination condition that is not automatically performed in accordance with a tree structure, but is selectively provided, and a determination reference according to an application can be set. For example, the distance between the target node and the root node, or the size of the rectangular area of the target node on the screen, can be used as the determination reference. The actual determination condition can be a process for dividing the rectangular area only down to the second level from the root node, or a process that prevents the rectangular area on the screen from being smaller than a square of 200 pixels.

Figure 19:
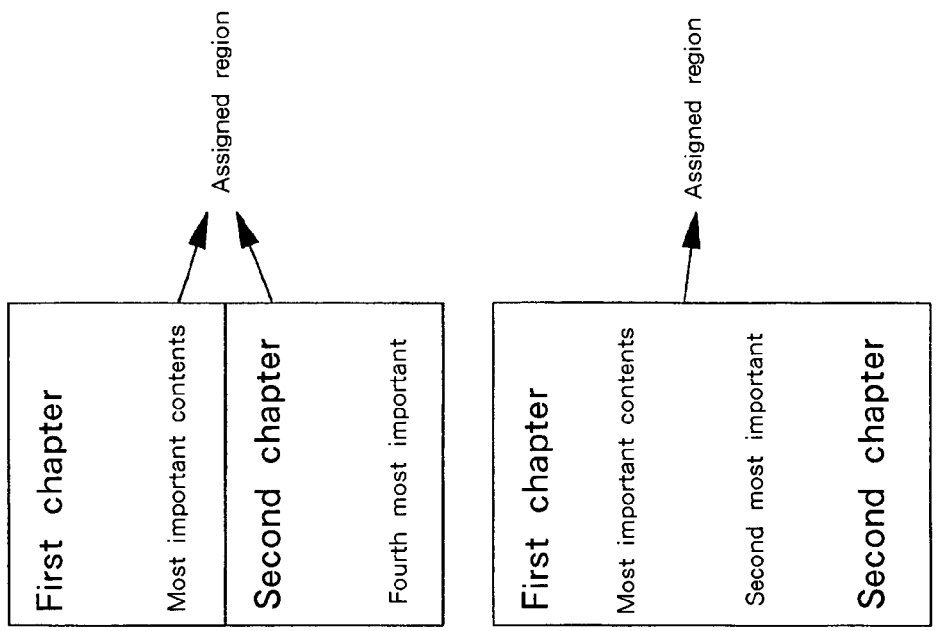
FIG. 19 is a diagram for explaining a state wherein display contents differ in accordance with a difference in the assigned regions.
Figure 19:
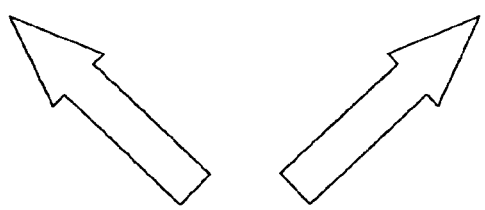
Figure 19:
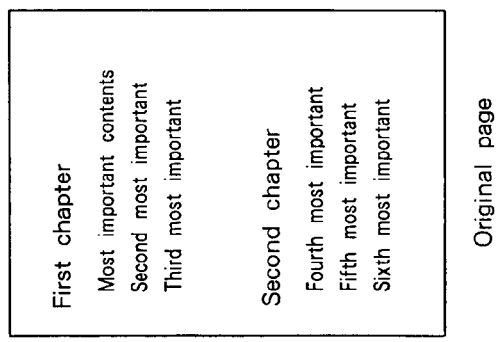

Within this determination condition, the screen of the web page that is finally displayed can be controlled. This will be specifically explained while referring to FIG. 19. Generally, as the size of an assigned region is reduced (the division of a rectangular area is continued as long as possible), the layout of the web page nears that of the original, but important contents of the original page tend to be missing. While referring to FIG. 19, on a screen whereon the rectangular area is divided into many segments, the overall ratio whereat the screen is occupied by "the first chapter" and "the second chapter" is close to that for the original pages. On the other hand, if the size of an assigned region is maintained (the rectangular area is not divided into many segments), while important contents tend to be retained in a digest, the layout is further removed from that of the original. In FIG. 19, on a screen whereon the rectangular area is roughly divided, more information is included concerning "the first chapter," while there is little information for "the second chapter," and the layout is further removed from that of the original. The division end condition is set selectively, and the contents of the condition can be arbitrary designated. Further, no special condition may be set. When the division end condition is not set, program control directly shifts from step 1403 to step 1407.

When at step 1405 the target node matches the division end condition, the rectangular area represented by the target node is established as the assigned region (step 1406).

When the target node does not match the division end condition, all the child nodes located immediately below the target node are listed (step 1407). When program control reaches step 1407, it means that in accordance with the results obtained at steps 1401 and 1403, all the child nodes of the target node are proposed assigned regions. Thus, all the child nodes of the target node are examined to determine whether each of them can display in their entirety the most important contents in the rectangular area on the screen (step 1408). This process will be described in detail later.

If at least one child node of the target node can not display the most important data, i.e., that has a rectangular area smaller than the area required to display the most important contents, it is assumed that the rectangular area of the target node can not be divided any further. Therefore, the division is halted, and the rectangular area represented by the target node is established as an assigned region (step 1409).

If each of the child nodes can display the most important contents, however, all the child nodes are regarded as processing targets, and the above described processing is recursively performed beginning at step 1401 (step 1410). When the processing has been performed for all the child nodes, the process for the target node is terminated.

This processing will be specifically described while referring to FIGS. 15 to 18. FIGS. 15 to 18, as well as FIGS. 9 to 12, are diagrams showing proposed assigned regions and the display of a web page. In FIGS. 15 to 18, a target node to be processed, i.e., an assigned region that is currently proposed, is enclosed within a circle. In addition, characters for which the font size was enlarged, in accordance with an instruction from a user, are displayed on the screen of the web page.

Figure 15:
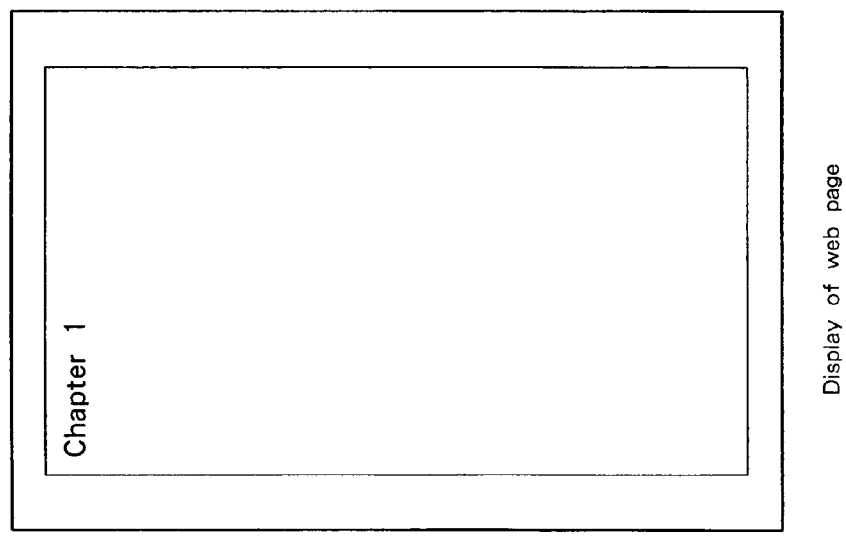
FIG. 15 is a diagram showing proposed assigned regions and a displayed web page, while specifically showing proposed assigned regions when a root node is used as a target, and a rectangular area represented by the root node.
Figure 15:
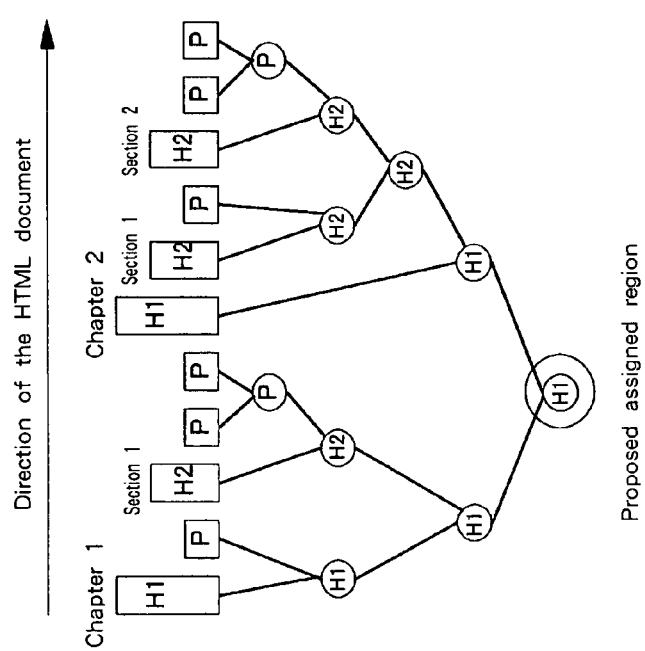

FIG. 15 is a diagram showing the proposed assigned regions, as viewed from the root node, and the rectangular area represented by the root node, which is a target node. While referring to FIG. 15, overall, the rectangular area of the target node (root node) occupies the screen of a web page, and all the characters in "chapter 1," which is the most important, in the contents of the HTML tag <H1> of the target node are displayed. Therefore, for the root node, program control advances through steps 1401, 1403 and 1405 in FIG. 14 to step 1408, and a check is performed to determine whether the two <H1> nodes, which are child nodes of the root node, can display the most important contents. Since the child nodes can display the most important contents, as will be described later program control advances to step 1410, whereat the process is performed for the two <H1> nodes, the child nodes.

Figure 16:
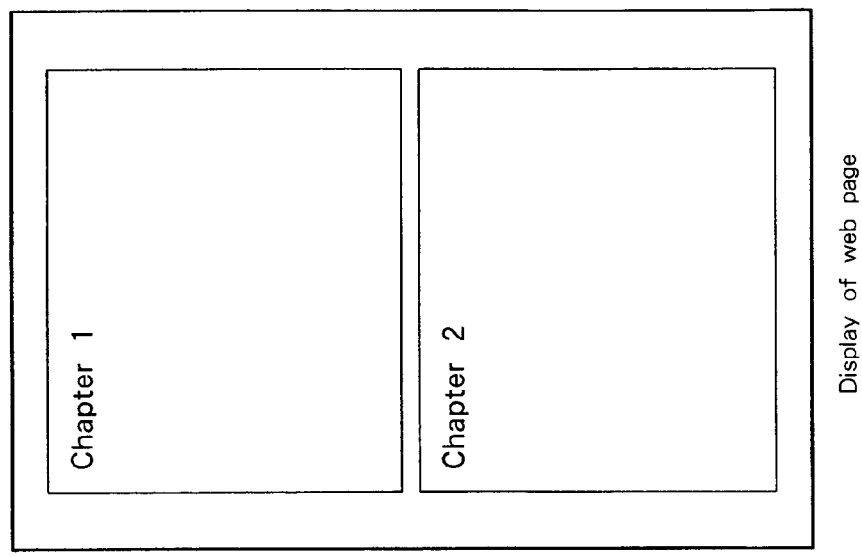
FIG. 16 is a diagram showing proposed assigned regions and a displayed web page, while specifically showing proposed assigned regions when nodes at the second level are used as targets, and rectangular areas represented by the pertinent nodes.
Figure 16:
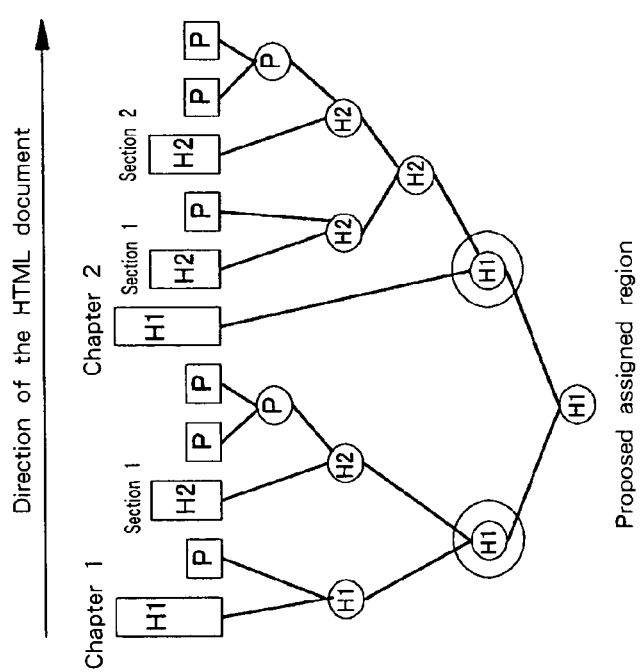

In FIG. 16, two nodes that are proposed assigned regions and the rectangular area represented by two target nodes are shown when, in the state in FIG. 15, the target node is shifted to the node immediately beneath the root node. While referring to FIG. 15, it is apparent that all the characters of "chapter 1" and "chapter 2," which are the most important contents of the HTML tags <H1> of the two target nodes, are displayed. When the process in FIG. 14 is performed for the two target nodes in FIG. 16, program control advances through steps 1401, 1403 and 1405 to step 1408. Then, a check is performed to determine whether two child nodes at the <H1> node on the chapter 1 side and two child nodes at the <H1> node on the chapter 2 side can display the most important contents. As will be described later, on the chapter 1 side, the target nodes can be shifted to the two child nodes, while on the chapter 2 side, the target nodes can not be shifted to the two child nodes.

Figure 17:
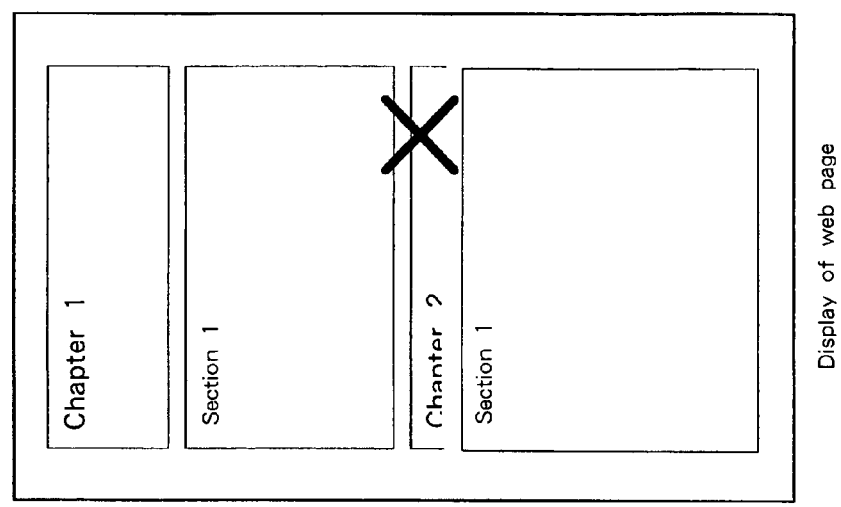
FIG. 17 is a diagram showing proposed assigned regions and a displayed web page, while specifically showing proposed assigned regions when nodes at the third level are used as targets, and rectangular areas represented by the pertinent nodes.
Figure 17:
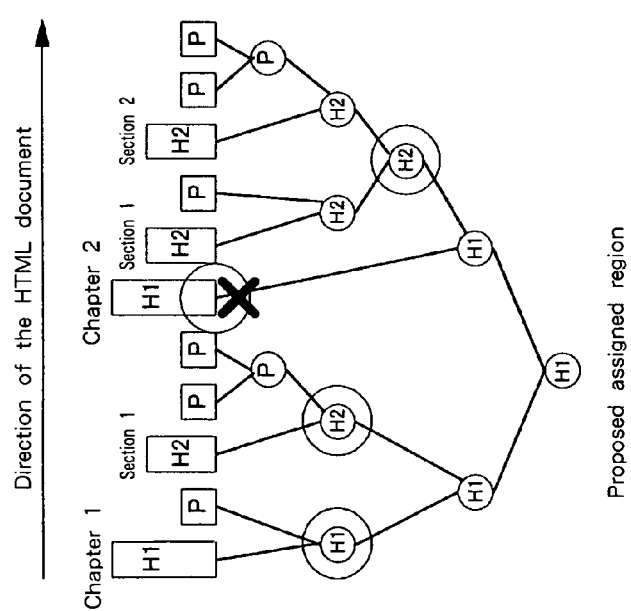

FIG. 17 is a diagram showing proposed assigned nodes and the rectangular areas of the individual target nodes when, in the state in FIG. 16, the two target nodes are shifted to nodes immediately beneath as new targets. While referring to FIG. 17, the two child nodes (target nodes) on the chapter 1 side display all the characters of "chapter 1" and "section 1," which are the most important contents of the HTML tags <H1> and <H2> for the nodes. The two child nodes on the chapter 2 side (target nodes) do not display all the characters of "chapter 2," which are the contents of the HTML tag <H1>. Therefore, on the chapter 1 side, as is shown in FIG. 17, the targets can be shifted to the two child nodes (<H1>, which represents chapter 1, and <H2>, which represents section 1). However, on the chapter 2 side, it is ascertained at step 1408 in FIG. 14 that display of all the child nodes is impossible, and for the node of the HTML tag <H1> the assigned region is established at the second level.

Figure 18:
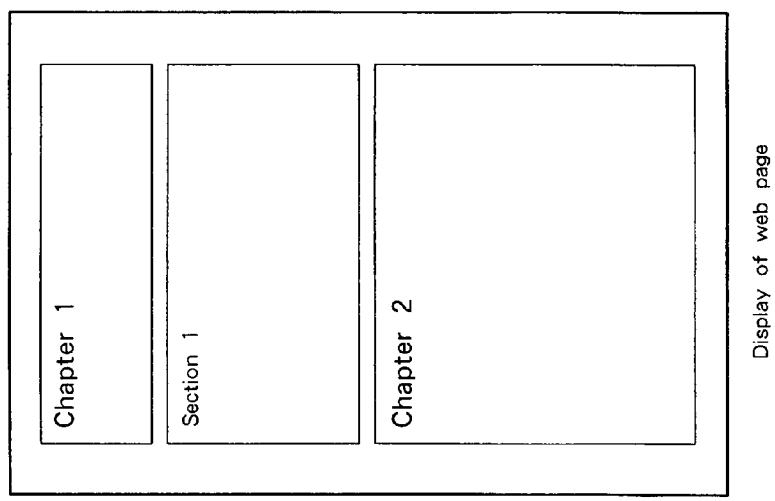
FIG. 18 is a diagram showing proposed assigned regions and a displayed web page, while specifically showing proposed assigned regions that are finally obtained by the region arrangement determiner 22, and rectangular areas represented by the nodes.
Figure 18:
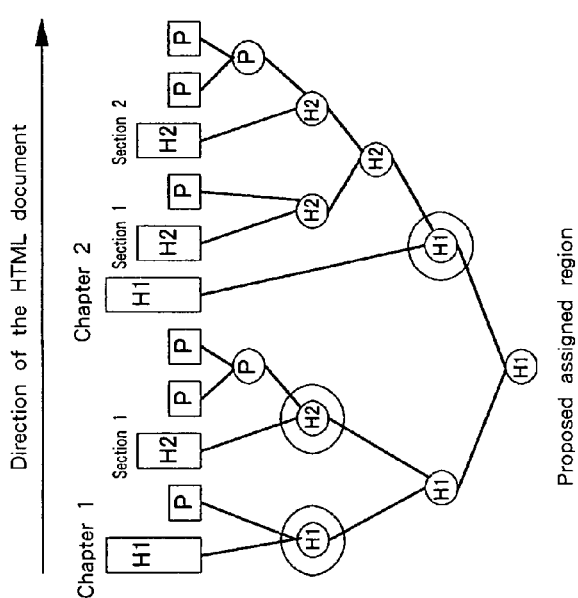

While an explanation is not given for the further processing, on the chapter 1 side the assigned region is also established for the nodes of the HTML tags <H1> and <H2> at the third level. FIG. 18 is a diagram showing nodes that are currently established as assigned regions, and the rectangular areas that are represented by the nodes. By referring to FIG. 18, the layout of the web page is determined using three assigned regions.

Figure 20:
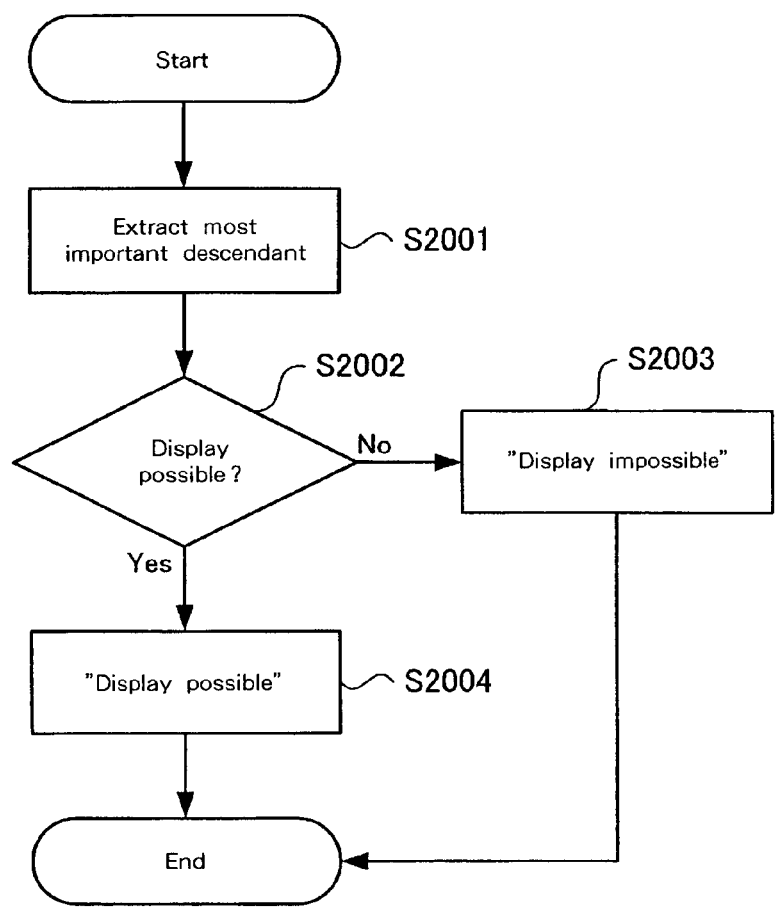
FIG. 20 is a flowchart for explaining a step in the processing in FIG. 14 to determine whether the display of a child node has been enabled.

A detailed explanation will now be given for the determination performed at step 1408 in FIG. 14 to ascertain whether the display of all the child nodes is enabled. FIG. 20 is a flowchart showing the determination processing.

In FIG. 20, first, a partial tree, which is beneath the target child node (one of child nodes of the target node in the processing in FIG. 14) of the tree structure, is scanned and the most important leaf node (the lowest node) is extracted (step 2001). This leaf node is called the most important descendant. The importance level of the leaf node is calculated by using the importance levels for the HTML tags in FIG. 13. The importance level of the leaf node is not the importance level itself, but is defined as the sum of the importance levels of all the nodes that are present along the path extending from the leaf node to the target child node. For the tree in FIG. 6 for example, when the target node is the <P> node that is positioned beneath the node <BODY>, and on the right end, the importance level of the leaf node <BIG> is the sum of the importance level of the HTML tag <BIG> and the importance level of the HTML tag <I> of its parent node.

The font size and the line spacing for the contents of the most important descendant extracted at step 2001 are changed as designated by a user. This designation may be externally entered by issuing a request each time the display controller 20 reads a web page, or may be registered in advance in accordance with individual users. That is, an instruction, such as, "a display with a font of at least 24 points is required" stored in a storage device (not shown), and when the display controller 20 reads a web page, the region arrangement determiner 22 reads this instruction. In this case, the most important descendant is enlarged to 24 points.

A check is then performed to determine whether the altered contents can be displayed within the rectangular area that the target child node represents on the screen (step 2002).

When the enlarged most important descendant is too large and can not be displayed within a rectangular area, it is assumed that the target child node can not display the most important contents in its own rectangular area on the screen (step 2003). If at the decision of step 1408 in FIG. 14 such a child node is found, program control moves to step 1409, and the assigned region is established.

When the enlarged most important descendant fits within the rectangular area, it is assumed that the target child node can display the most important contents in its own rectangular area on the screen (step 2004). When at the decision step 1408 in FIG. 14 all the child nodes return this response, program control advances to step 1410, and the process is initiated for child nodes.

The intra-region contents determiner 23 receives information concerning an assigned region that is determined by the region arrangement determiner 22, and the tree structure that reflects the assigned region of the HTML document of a web page. Then, the intra-region contents determiner 23 determines for each assigned region, the contents to be displayed in a rectangular area that the pertinent assigned region occupies on the screen. In accordance with the display contents that are determined in this fashion, the web browser 10 displays the thus controlled web page on a display screen (not shown) of the information processing terminal 100.

Figure 21:
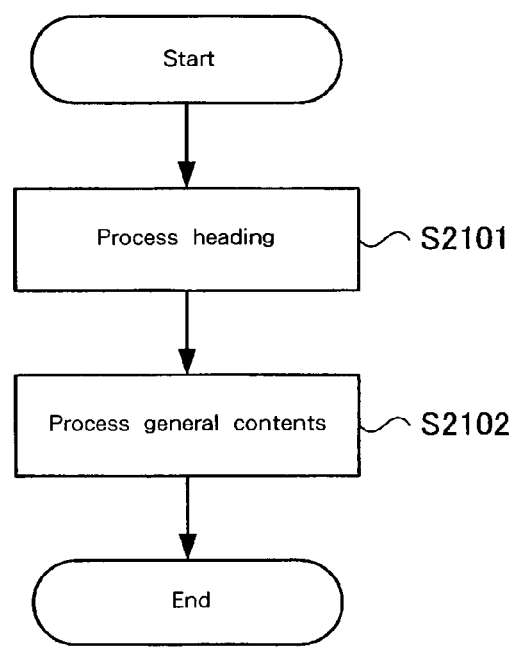
FIG. 21 is a flowchart for explaining the processing performed by the intra-region contents determiner 23 to determine the contents to be displayed in an assigned region that the region arrangement determiner 22 set for a web page.
Figure 22:
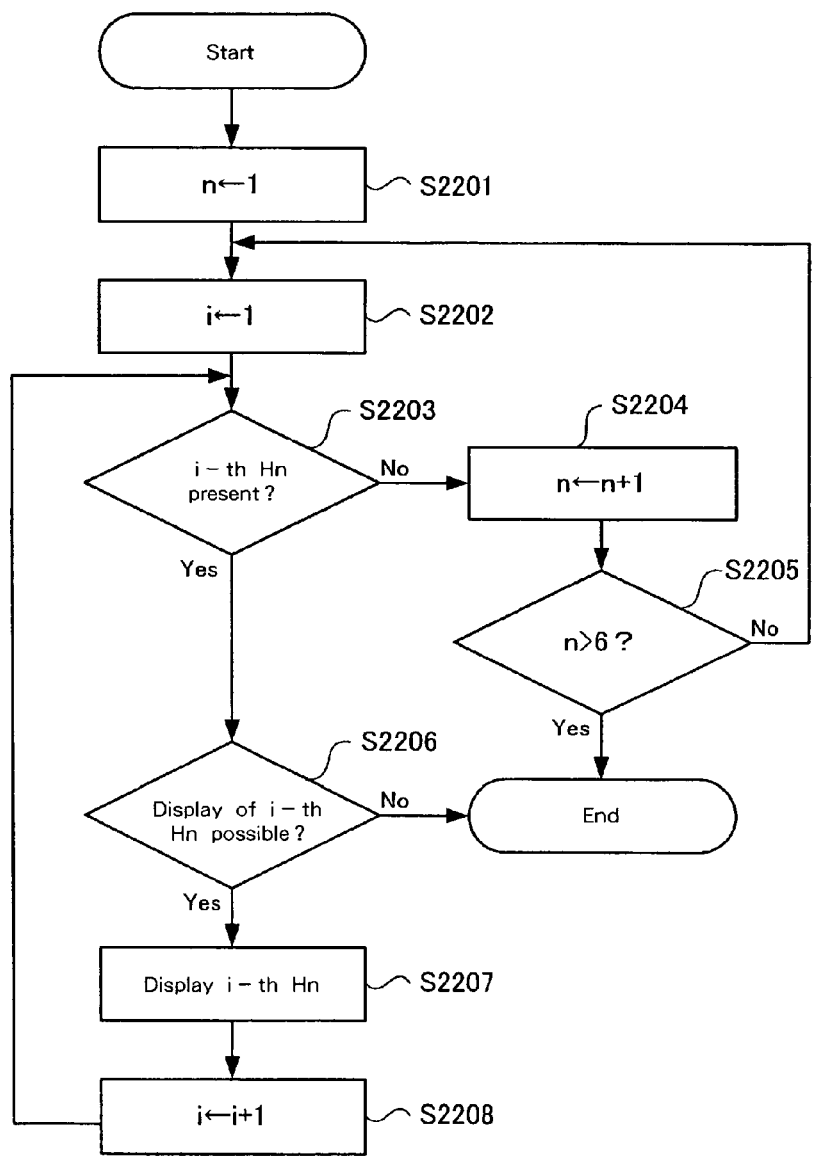
FIG. 22 is a detailed flowchart for explaining a heading process included in the processing in FIG. 21.
Figure 23:
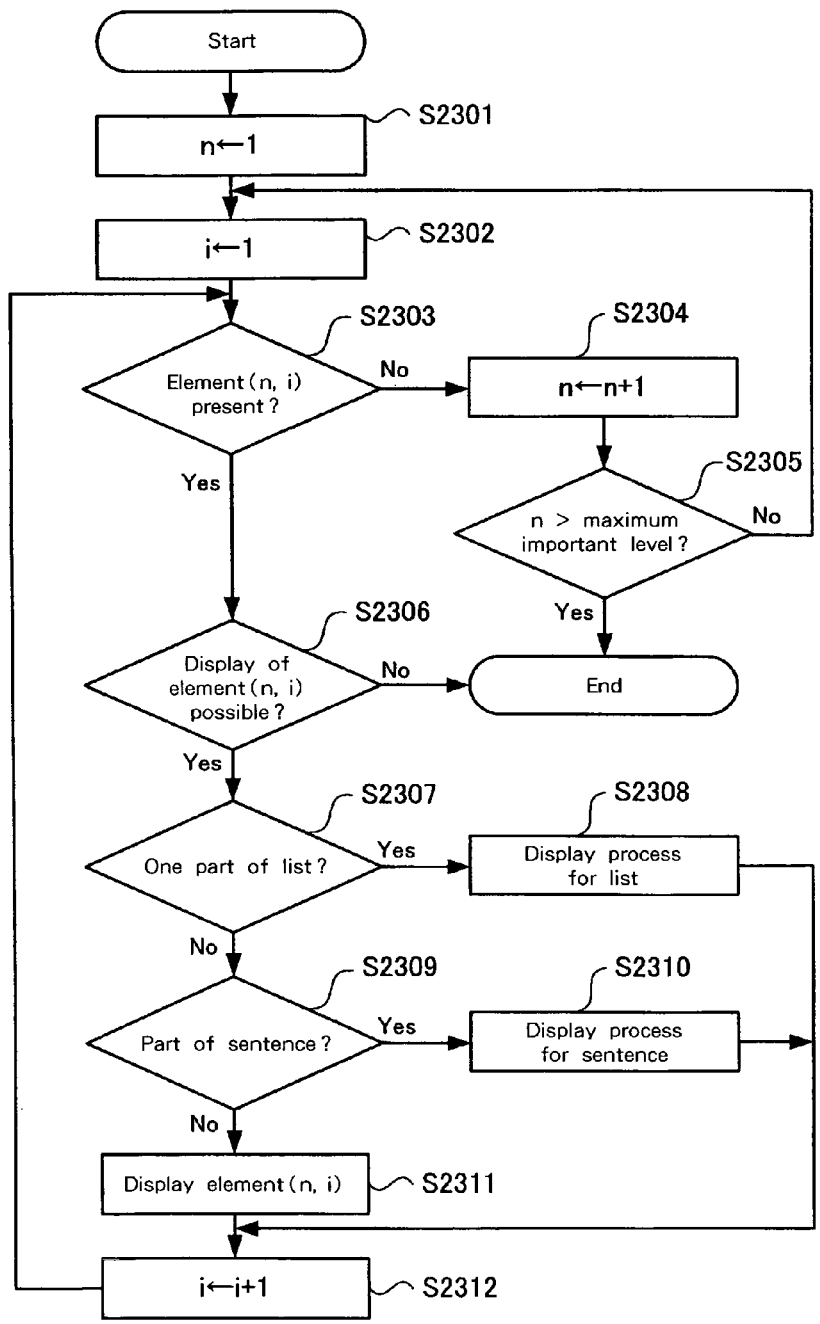
FIG. 23 is a detailed flowchart for explaining a general contents process included in the processing in FIG. 21.
Figure 24:
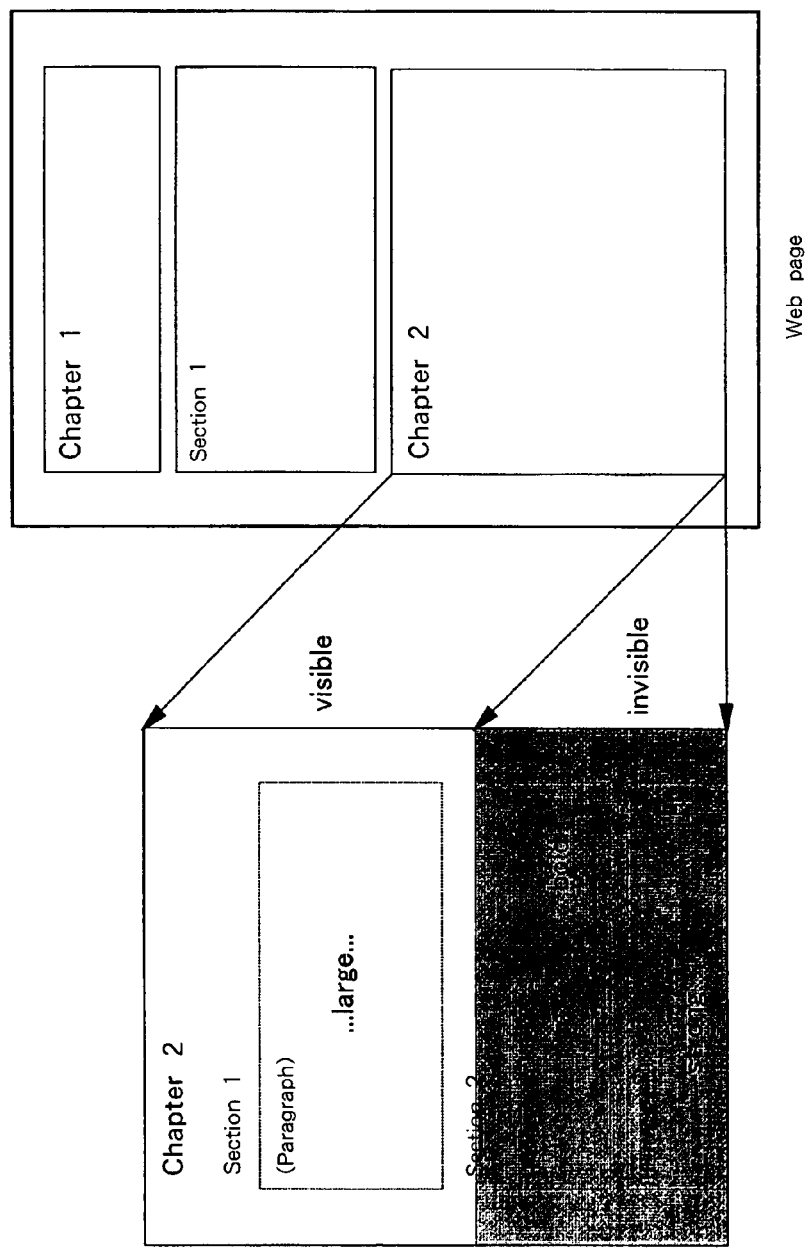
FIG. 24 is a diagram for explaining the fact that all the original contents can not be displayed in an assigned region that is determined by the region arrangement determiner 22.
Figure 25:
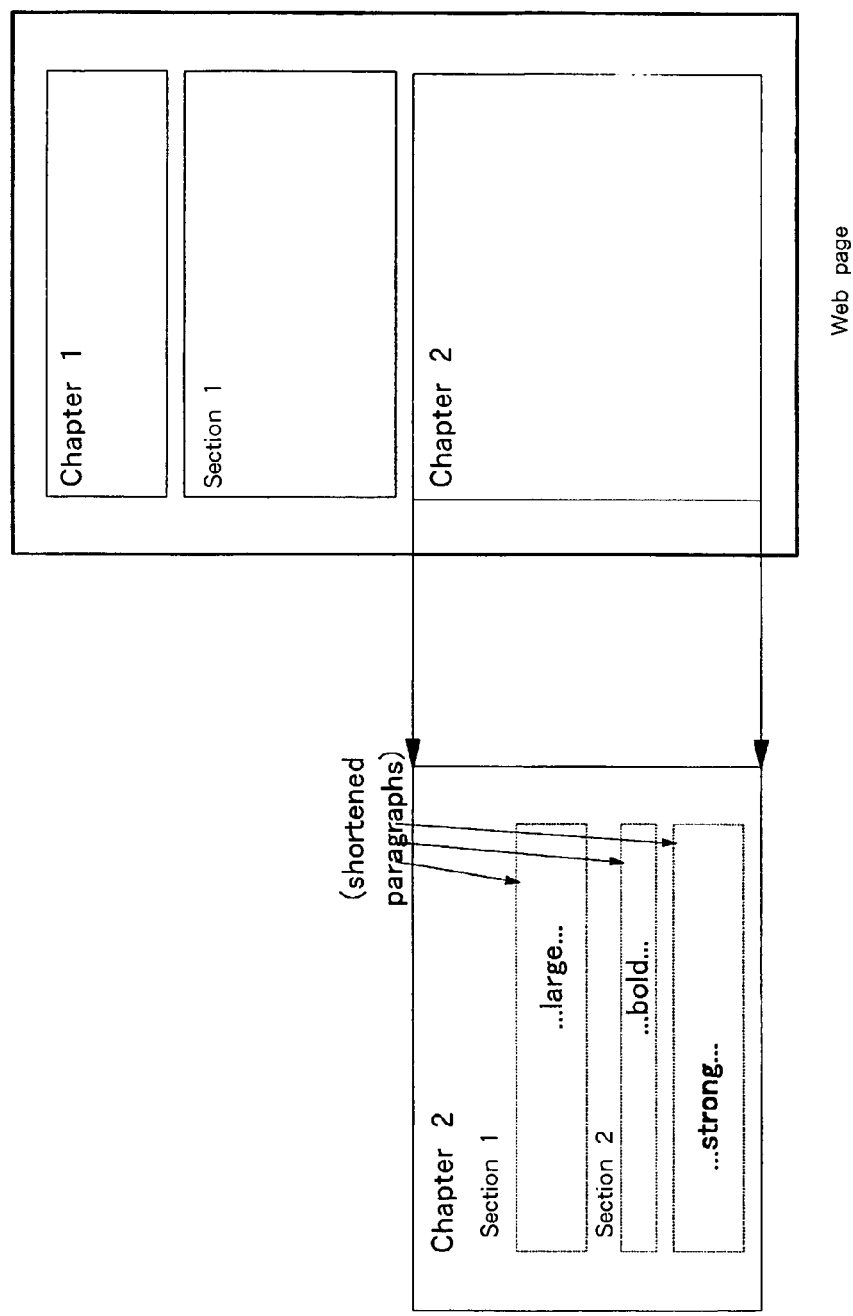
FIG. 25 is a diagram for explaining a state wherein the contents determined by the intra-region contents determiner 23 are displayed in the assigned region in FIG. 24.

While referring to the flowcharts in FIGS. 21 to 23 and the diagrams in FIGS. 24 and 25 for explaining the state, an explanation will now be given for the processing performed, by the intra-region contents determiner 23, to determine the contents to be displayed in the assigned region that is set for the web page by the region arrangement determiner 22. FIGS. 24 and 25 are diagrams for explaining a specific example for a web page in which three assigned regions, which are determined during the processing performed in FIGS. 14 and 15 to 18, are set, and a display example for the data in the assigned region (the lowest region in the drawing) that includes, as the display contents for the web page, chapter 2.

As is apparent from FIG. 18, one <H1>, two <H2>s and three <P>s are included in the assigned region. Since the size of the assigned region is obtained from the rectangular area of the HTML tag, it corresponds to the original font size of the web page. Therefore, if the characters are enlarged in accordance with an instruction received from a user, all the contents of the node that corresponds to the assigned region can not be displayed. The dotted portion in FIG. 24 is a portion that can not be displayed in the assigned area. If this portion is simply clipped and abandoned, important information (e.g., the heading for "section 2") will also be lost. Thus, the contents of the node that corresponds to the assigned node are divided for the individual HTML tags, the obtained HTML tag portions are sorted in the order of the importance levels for the HTML tags, and as many portions as possible are displayed in the assigned region. The HTML tags in this case include both block level elements and inline elements. In the example in FIG. 24, enhanced characters, such as a large font and bold or strong characters, are included in the paragraphs, and are regarded as reflecting the intent of the web page creator. Therefore, these enhanced characters are displayed prior to the other portion of the paragraphs.

FIG. 25 is a diagram showing the resultant state wherein the important contents in the node that corresponds to the assigned region are displayed in accordance with the size of the assigned region.

Next, an explanation will be given for the processing performed by the intra-region contents determiner 23 to determine the contents to be displayed in an assigned region. In the flowchart in FIG. 21, this processing is separated into a process for a heading (step 2101) and a process for the other general contents (step 2102). The detailed processing performed at step 2101 for the heading is shown in FIG. 22, and the detailed processing performed at step 2102 for the other general contents is shown in FIG. 23.

The process for the heading will now be described. In FIG. 22, first, a parameter n is defined as a natural number that represents the heading level, and a value of 1 is assigned to it (step 2201). Thus, the tag <H1> is defined as a processing target. The heading level has its maximum value when the parameter n is 1 (i.e., <H1>), and its value is reduced as n is increased. For the HTML 4.0, the range of the parameter n is 1≦n≦6.

Next, for the HTML document to be processed, a parameter i is defined that represents the i-th heading at the heading level that is specified by the parameter n, and a value of 1 is assigned to it (step 2202). A check is performed to determine whether the i-th <Hn> is present in the target HTML document (step 2203).

When the i-th <Hn> is not present in the target HTML document, the value of the parameter n is incremented by one (step 2204). This corresponds to the decrementing of the heading level by one. A check is performed to determine whether the value of the parameter n exceeds a maximum heading level (step 2205). As is described above, since for the HTML 4.0 the maximum value for the parameter n is 6, an examination is performed to determine whether n>6. When the value of the parameter n has exceeded 6, the processing is terminated. If, however, the value of the parameter n does not exceed 6, program control returns to step 2202 and the above processing is repeated.

When, at step 2203, the i-th <Hn> is present in the target HTML document, the display condition of the characters for the i-th <Hn> is changed as is designated by the user, and a check is performed to determine whether the altered characters can be displayed in the assigned region (step 2206). If, as the alteration of the character display condition, the font size is increased or the line spacing or the character spacing is extended, it may not be possible to display all the characters in the region assigned for the original rectangular area <Hn>. If none of the characters can be displayed, the process for the heading (step 2101) is terminated. Since this means that no more data can not be displayed in the current assigned region, the process for the general contents (step 2102) is also not performed.

However, when even a part of the characters can be written in the assigned region, the characters included in the i-th <Hn> are written therein (step 2207). When characters are enlarged and only a part of them can be written in the assigned region, the display contents are changed so as to notify the user. Assume that the heading included in <Hn> is a string of twelve characters "my home page" and that only ten characters are to be displayed in the assigned region. In this case, several of the last characters are omitted, and an " . . . " symbol, which indicates that characters have been omitted, is added to the heading, so that "my home . . . " is displayed. Thereafter, the value of the parameter i is incremented by one (step 2208), and program control returns to step 2203 to continue the process.

The process for the general portion will now be described. In FIG. 23, first, a parameter n is defined that represents the importance level of the HTML tag, and a value of 1 is assigned to it (step 2301). The parameter n indicates that the pertinent HTML tag has the n-th highest importance level of all the HTML tags in the HTML document. Therefore, as the value of the parameter n is increased, the importance level is reduced.

Next, a parameter i is defined that represents the i-th HTML tag at the importance level that is specified by the parameter n, and a value of 1 is assigned to it (step 2302). A check is then performed to determine whether the i-th HTML tag (an element(n, i) in FIG. 23) of the HTML tags having the n-th importance level is present in the target HTML document (step 2303).

If the i-th HTML tag is not present in the HTML document, the value of the parameter n is incremented by one (step 2304). This corresponds to the decrementing of the importance level of the current HTML tag by one. Following this, a check is performed to determine whether the value of the parameter n has exceeded the maximum value (step 2305). The maximum value of the parameter n is determined in accordance with the importance level that is set for the HTML tag. For example, since 18 importance levels are set in the example in FIG. 13, the maximum value of the parameter n is 18, and a determination is made to determine whether n>18. If the value of the parameter n exceeds 18, the processing is terminated. If the value of the parameter n does not exceed 18, program control returns to step 2302, and the process is continued.

When, at step 2303, the i-th HTML tag is present in the target HTML document, the display condition for the characters, which are the contents in the i-th HTML tag (element (n, i)) having the n-th importance level, are changed as is designated by the user. Then, a check is performed to determine whether the changed characters can be displayed in the assigned region (step 2306). When, as the alteration of the character display condition, the font size is increased or the line spacing or the character spacing is extended, it may not be possible to display all the characters in the region assigned for the original rectangular area. If none of the characters can be displayed, the process for the general contents (step 2102) is terminated.

If, however, even one part of the characters can be written in the assigned region, a check is performed to determine whether the i-th element(n, i), which has the n-th importance level, is a part of a list (step 2307). To prepare a list in an HTML document, one method is available that employs tags <UL>, <OL>, <DIR>, <MENU> and <DL> (five types for the HTML 4.0) to identify a list, and another method is available that for the common text employs <BR> (a line feed) to prepare what appears to be a list. As a method for distinguishing between what appears to be a list and the common text, for example, when the line feed of text for each line is continued at least a predetermined number of times (e.g., three times), that text is ascertained to be a list.

If the i-th element is determined to be a part of the list, the inherent display process for the list is performed, i.e., the characters are so displayed that the number of lines for each component of a list is the same as that of the original layout (step 2308). That is, even after a component that originally is displayed using one line is enlarged in accordance with the vision characteristic of a user, the enlarged component is also displayed on one line. And in accordance with where the i-th element (n, i), which has the n-th importance level, is located in the component of the list, the end, the head or the middle portion of the sentence of the component is omitted as needed, so that the contents of the element having the n-th importance level are displayed. Then, the display is appropriately changed to notify the user that a portion has been omitted (for example, the omitted portion is replaced with a symbol that indicates a part has been omitted).

It should be noted that the process performed for list at steps 2307 and 2308 is optional, and that a special process is not necessarily required. In this case, program control skips the decision process at step 2307 and goes to step 2309. The process at step 2308 is also not performed.

If the i-th element(n, i) having the n-th importance level is not a list, a check is performed to determine whether the element(n, i) is a part of a sentence (step 2309). This determination is performed by examining whether a delimiter, such as a "comma" or a "continuation of a period and a white space," is included in the characters of the element.

If a delimiter is included in the characters, it is ascertained that the element is one part of a sentence, and the inherent display process is performed to display the entire sentence, to include the pertinent characters (step 2310). When the entire document can not be displayed in the current assigned region, the end, head or the middle portion of the sentence is omitted in accordance with the location of the element in the sentence, so that the element remains in the contents that are displayed. Then, the display is appropriately changed to notify the user a portion has been omitted (e.g., the omitted portion is replaced with a symbol that indicates a part has been omitted).

It should be noted that the process performed at steps 2309 and 2310 for one part of the sentence is optional, and a special process is not necessarily required. In this case, program control skips the decision process at step 2309 and goes to step 2311. The process at step 2310 is also not performed.

If, at step 2306, it is ascertained that at least a part of the characters can be written in the assigned region, and if the i-th element(n, i) having the n-th importance level is neither a part of a list nor a part of a sentence, or if the decision steps 2307 and 2309 are not performed, the characters that constitute the contents of the element are written in the assigned region (step 2311). When the characters are enlarged, and as a result only a part of the characters can be written in the assigned region, the display contents are changed to notify the user. Thereafter, the value of the parameter i is incremented by one (step 2312), and program control returns to step 2303 to continue the process.

Through the above described processing, the display control process by which the web page is displayed is completed by changing the font size or the line spacing, while the layout of the web page is preserved. As is described above, according to the main use of this embodiment, when an elderly person or a vision impaired person has difficulty in reading a web page for which the original font size is used, the web page can be displayed by using a user designated font size that is easy for the user to read. In this case, since the characters are enlarged while the layout of the web page is preserved, part of the document may not be displayed. However, in accordance with the above described display control, an abstract can be prepared and displayed by retaining the important portions in the document that constitute the contents of the assigned regions, so that important information is not lost.

If a user is to obtain the information that can not be displayed in an assigned region due to the generation of an abstract, means for outputting the information can be provided. Specifically, a user can employ a mouse to move and click a cursor on an assigned region from which information concerning the web page displayed in the window on the screen can be obtained. Thus, in addition to the window in which the web page is displayed, an additional details display window is opened in which all the information included in an assigned region can be displayed. Since the additional details display is provided regardless of the layout of the web page, a font size or line spacing designated by a user can be employed to display a document.

In addition, instead of information being displayed separately in an additional details display window, speech synthesis can be used to orally output information that can not be displayed in an assigned region due to the preparation of an abstract.

A well known technique, such as general information display means or a speech synthesis system, can be employed to provide an additional details display or to read and orally output information.

Figure 26:
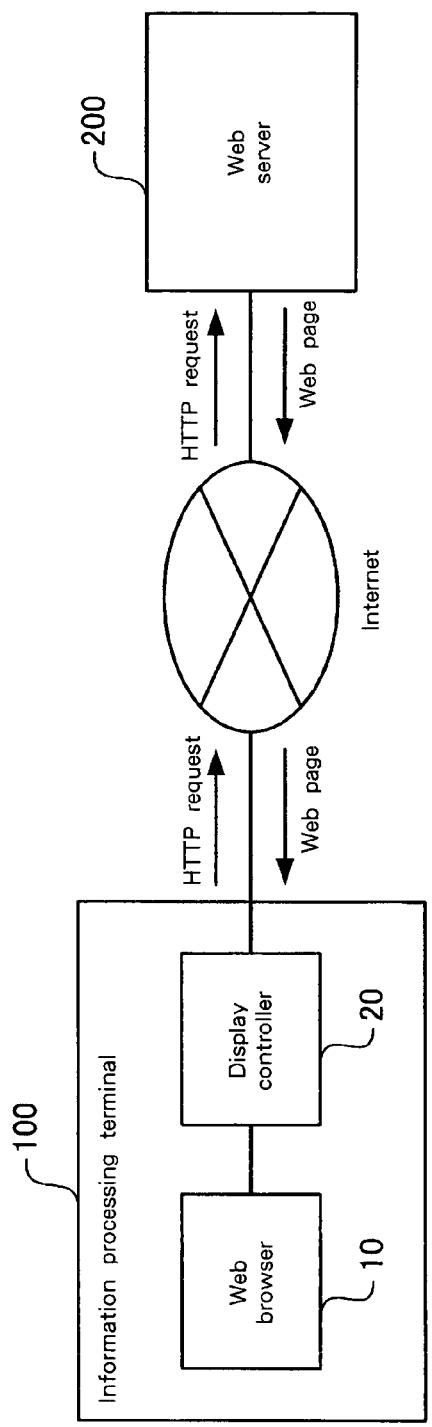
FIG. 26 is a schematic diagram for explaining an employment form used for an information processing terminal that comprises the display controller 20 of this embodiment.

FIG. 26 is a schematic diagram that, in accordance with the embodiment, illustrates the employment form of the information processing terminal 100 that comprises the thus arranged display controller 20 for a web page (an HTML document). In FIG. 26, the information processing terminal 100, which is connected to the Internet, issues an HTTP request to the general web server 200, and in response receives the original data for a web page. Upon the receipt of the original data contents of the web page, the information processing terminal 100 permits the display controller 20 to edit the web page, while at the same time it preserves the web page layout. Then, the web page is displayed by the web browser 10.

In the editing process performed by the display controller 20, when the characters of the web page are to be enlarged in accordance with an instruction received from a user, through the above processing an abstract is prepared using the importance levels for the HTML tags and the important portions are maintained.

The display controller 20 of the information processing terminal 100 can be provided by an application program as a local proxy that is resident in the information processing terminal 100, or can be provided as an additional function of the web browser 10 by using a plug-in.

A specific method whereby a proxy that serves as the display controller 20 controls the display of the web page can be arranged as follows. The algorithm used by the layout structure analyzer 21, the region arrangement determiner 22 and the intra-region contents determiner 23 of the display controller 20 can be embedded in the HTML document using a script language, so that when a web page is to be displayed by the web browser 10, the process can be performed based on the script.

Figure 27:
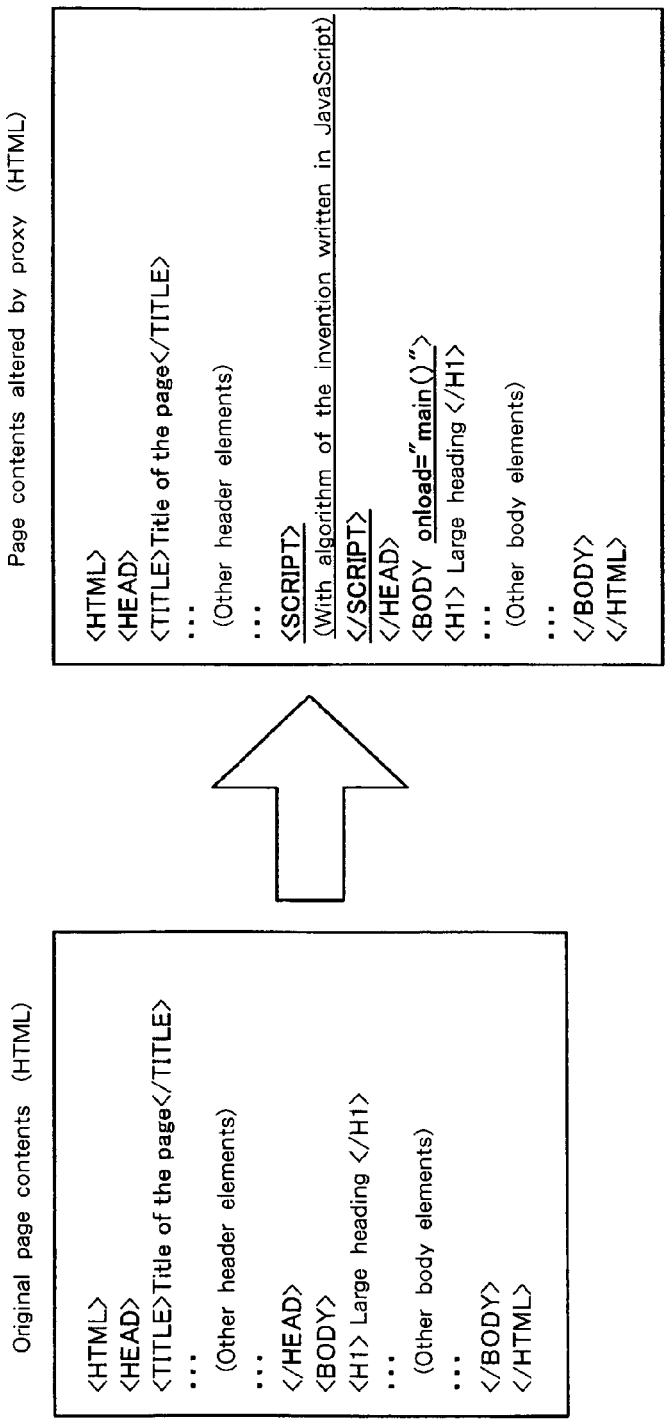
FIG. 27 is a diagram showing an example where JavaScript is used to embed a display control algorithm in an HTML document.

FIG. 27 is a diagram showing an example wherein a display control algorithm is embedded in an HTML document using JavaScript. The underlined portion of the edited HTML document is the portion that is altered. The portion from <SCRIPT> to </SCRIPT> is an algorithm, and onload="main( )" designates the portion of the algorithm that is to be executed first. When the HTML document in which the JavaScript portion is embedded is displayed by the web browser 10, the display is controlled in accordance with the algorithm that is written in the script. It should be noted that JavaScript is automatically executed by onload designation.

Figure 28:
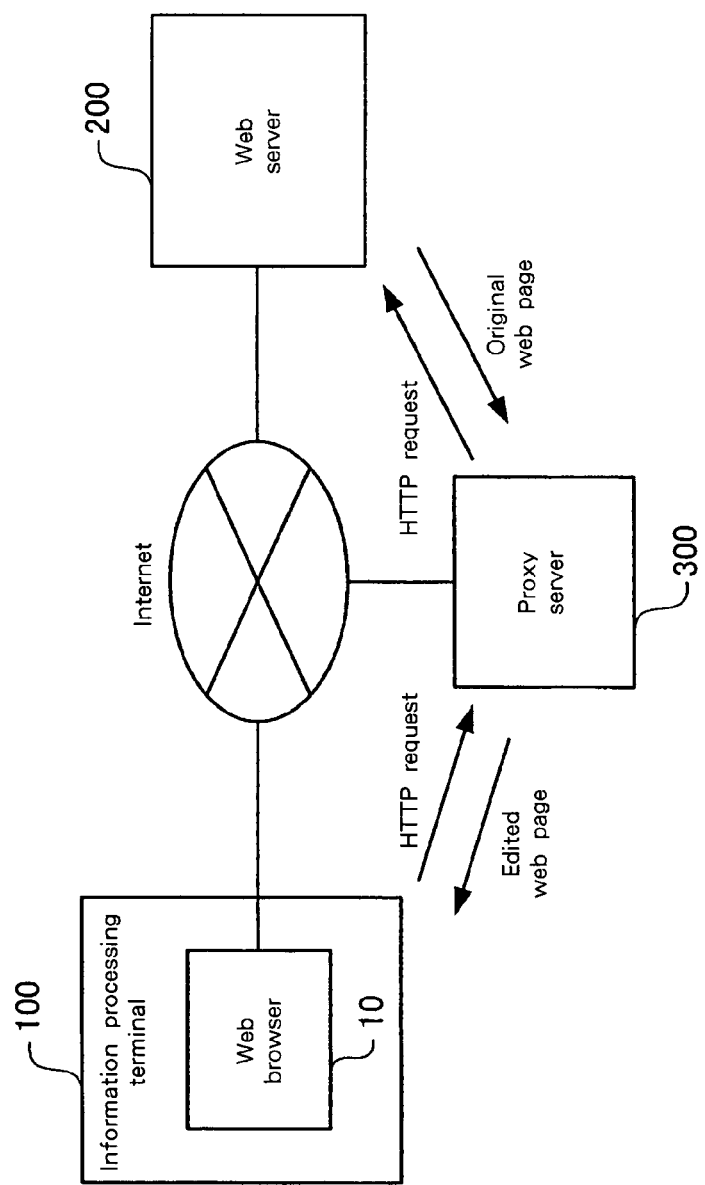
FIG. 28 is a diagram for explaining the arrangement whereby a proxy server located on a network carries out a document editing function.

Furthermore, the process for embedding the script in an HTML document to exercise display control need only be completed just before the web page is displayed by the web browser 10 of the information processing terminal 100. Therefore, instead of providing the display controller 20 for the information processing terminal 100, as is shown in FIG. 28 a proxy server 300 may be provided on the Internet, and the embedding of the script can be accomplished as a function of the proxy server 300. That is, when an HTTP request is issued by the information processing terminal 100 to the web server 200 via the proxy server 300, a web page is transmitted by the web server 200 and is edited by the proxy server 300, and the edited web page is then transmitted to the information processing terminal 100. In this case, for each user only the font size and the line spacing need be designated and stored in the proxy server 300, and the identity of a user verified when he or she accesses the web server 200. In this fashion, the display control can be personally exercised for each user.

Further, as is shown in FIG. 29 the arrangement for embedding a display control script in an HTML document may be provided for the web server 200. In the example in FIG. 29, a page editor 210 of the web server 200 corresponds to the display controller 20 of the information processing terminal 100. In this example, when a command for requesting display control is added to an HTTP request issued by the information processing terminal 100, the page editor 210 of the web server 200 edits the requested web page, and transmits the edited web page to the information processing terminal 100. In this case also, for each user only the font size and the line spacing need be designated and stored in the web server 200, and the identity of the user verified when he or she accesses the web server 200 in order for the display control to be exercised personally for each user. Or, an instruction for designating a font size or a line spacing may be added to a command that is issued by the information processing terminal 100 to request that display control be exercised personally for a user.

In this embodiment, a web page has been employed as a processing target, and the display of the web page using a web browser has been controlled. However, the application of the present invention is not limited to web pages. When various document editing systems, such as word processors, can obtain control information for setting the style used for a document, the control information can be employed to define the strengths of delimiters and the importance levels of words and sentences, so that the strengths of the delimiters and the importance levels can be used to perform the above editing process wherein the layout is preserved.

Advantages of the Invention

As is described above, according to the present invention, the contents of a document can be displayed in accordance with a desired display condition (font size, line spacing, character spacing, etc.), while the layout of the document is preserved.

Further, when characters are enlarged and displayed while the layout is being preserved, the display contents can be edited without important information in the document being erased.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An information processing system comprising:
   document display means for displaying an original document having content according to a predetermined layout; and display control means for controlling a method used by said document display means to display said original document, said display control means including a layout structure analyzer for analyzing the structure of the layout of said original document, said layout structure analyzer detecting a delimiter used in each portion of said original document for determining said layout, and employing portions of said original document as nodes for generating, as said structure of said layout, a tree structure wherein a strength of said delimiters are hierarchically recorded;

a region arrangement determiner for dividing an HTML web page corresponding to said original document, under a user's desired display condition, into regions that are allocated to reflect said structure of said original document, whereby the contents of said page are displayed, in order to display said original document in accordance with regions that are allocated and that reflect said structure of said original document layout that is obtained by said layout structure analyzer, said region arrangement determiner ascertaining regions that satisfy a predetermined rule concerning said layout of said original document structure and that preserve portions, corresponding to each of said nodes in said tree structure, that are large enough to display a part of the contents of said original document using characters that match said desired display condition, and an intra-region contents determiner for determining which contents of said original document are to be displayed inside each of said allocated regions that are determined by said region arrangement determiner, wherein said document display means is adapted to display contents of the original document according to said user's desired display condition such that sizes and the positions of the regions are controlled to maintain a balance between the preservation of the structure of the layout for the document and the loss of content.

2. An information processing system according to claim 1, wherein said intra-region contents determiner designates a priority order for control information for controlling the style of a document, and in accordance with said priority order, determines for each portion of said original document, the contents that are to be displayed in a corresponding assigned region.

3. An information processing system according to claim 1, further comprising: detailed contents display means for displaying, separately from the contents selected by said intra-region contents determiner, the contents of a portion that corresponds to the location of an assigned region that is determined by said region arrangement determiner of said display control means.

4. An information processing system according to claim 1, further comprising: detailed contents reading means for using speech synthesis to output the contents of said portions of said original document corresponding to said locations in said assigned regions that are determined by said region arrangement determiner of said display control means.

5. A computer program product comprising a computer usable medium having computer readable program code means embodied therein for causing display of contents of an original document which has a predetermined layout, the computer readable program code means in said computer program product comprising:

computer readable program code means for: extrracting the structure of the layout for said original document as a combination of several areas;

computer readable program code means for: increasing the size of the characters in the font used in said areas while the sizes and the locations of said areas are substantially preserved; and computer readable program code means for: selectively displaying said characters included in said areas in accordance with predetermined conditions as specified by a user, wherein contents of the original document are displayed according to said user's predetermined conditions such that sizes and positions of the assigned regions are controlled to maintain a balance between the preservation of the structure of the layout for the document and loss of content.

6. A proxy server, which is located between a web server and a client terminal and which performs a predetermined process for an HTML web page comprising contents of an original document received from said web server, and transmits the resultant web page to said client terminal, said proxy server having components for performing said process comprising:

a layout structure analyzer for analyzing the structure of the layout for said web page corresponding to said original document received from said web server, said layout structure analyzer detecting a delimiter used in each portion of said web page for determining said layout, and employing portions of said web page as nodes for generating, as said structure of said layout, a tree structure wherein a strength of said delimiters are hierarchically recorded;

a region arrangement determiner for dividing said web page into regions that are allocated to reflect said structure of said web page layout that is obtained by said layout structure analyzer, when contents of said web page are displayed under a user's desired display condition, said region arrangement determiner ascertaining regions that satisfy a predetermined rule concerning said layout of said web page structure and that preserve portions, corresponding to each of said nodes in said tree structure, that are large enough to display a part of the contents of said web page using characters that match a desired display condition; and an intra-region contents detenniner for determining the contents of said original document to be displayed inside each of said allocated regions that are determined by said region arrangement determiner, wherein contents of the original document are displayed according to said user's desired display condition such that sizes and the positions of the regions are controlled to maintain a balance between the preservation of the structure of the layout for the document and loss of content.

7. The proxy server according to claim 6, wherein said layout structure analyzer defines the level of a delimiter for style information that is used to display said web page at said client terminal, defines the layout of said web page, and detects said level of said delimiter in said style information that is written in said web page received from said web server, regards, as nodes, the individual portions of said web page that are separated in accordance with said style information.

8. A web page display control method for controlling the display of an HTML web page comprising contents of an original document using a browser, said method comprising:

a web page layout structure analyzation step of analyzing the structure of the layout for said web page corresponding to said original document, said layout structure analyzer detecting a delimiter used in each portion of said web page for determining said layout, and employing portions of said web page as nodes for generating, as said structure of said layout, a tree structure wherein a strength of said delimiters are hierarchically recorded;

a web page division step of, under a user's desired display condition, dividing said web page into regions that are allocated to reflect said structure of said layout of said web page that is obtained at said web page layout structure analyzation step, said division step including ascertaining said regions that satisfy a predetermined rule concerning said layout of said web page structure and that preserve portions, corresponding to each of said nodes in said tree structure, that are large enough to display a part of the contents of said original document using characters that match said desired display condition;

a web page contents determination step of determining the contents of said original document that are to be displayed inside each of said allocated regions determined at said web page division step; and a web page contents display step of arranging, in a window for displaying said web page, said assigned regions determined at said web page division step, and displaying said contents of said web page that are determined at said web page contents determination step, wherein contents of the original document are displayed according to said user's desired display condition such that sizes and the positions of the regions are controlled to maintain a balance between the preservation of the structure of the layout for the document and loss of content.

9. A web page display control method according to claim 8, wherein said web page layout structure analyzation step includes the steps of:

employing style information written on said web page to extract a first tree structure wherein portions of said original document that are separated in accordance with said style information are defined as nodes; and ranking each of said nodes of said first tree structure based on the level of a delimiter that is predetermined for said style information, and generating a second tree structure wherein a node that corresponds to the style information having the highest level of delimiter is employed as a root node and the level of said delimiter is reflected.

10. A web page display control method according to claim 9, wherein, at said step of dividing said web page, beginning with said root node in said second tree structure, performing a process to determine whether, under a desired display condition, at least a part of the contents of a portion specified by said node of said web page can be displayed at the location of said portion; and, when the contents can be displayed, recursively performing the process with the child nodes of the node; and, when no contents can be displayed, dividing said web page using an assigned region that is positioned at the same location and has the same size as the portion specified by a last node whose contents are displayed.

11. A web page display control method according to claim 8, further comprising the step of:

receiving a request designating an assigned region that is determined at said web page division step performed following said web page contents display step, and displaying the contents of a portion of said web page that said assigned region contains.

12. A web page display control method for using a browser to control the display of an HTML web page comprising contents of an original document, said method comprising the steps of:

detecting a delimiter used in each portion of an original document for determining a layout, and employing portions of said original document as nodes for generating, as a structure of said layout, a tree structure wherein a strength of said delimiters are hierarchically recorded;

extracting the structure of the layout for said web page corresponding to said original document as a combination of several areas that satisfy a predetermined rule concerning said layout of said web page structure and that preserve portions, corresponding to each of said nodes in said tree structure, that are large enough to display a part of the contents of said web page using characters that match a desired display condition;

increasing a font size of the characters included in said areas in accordance with said desired display condition, while sizes and locations of said areas are substantially preserved; and displaying as many as possible of said characters included in said areas in accordance with a condition defined for HTML tags of said web page, wherein contents of the original document are displayed such that sizes and the positions of the several areas are controlled to maintain a balance between the preservation of the structure of the layout for the document and loss of content.

13. A storage medium on which a computer-readable program is stored by input means provided for a computer, said computer readable program permitting said computer to perform:

an HTML web page layout structure analyzation process for analyzing a structure of a layout for said web page, said web page comprising contents of an original document, said analyzation process detecting a delimiter used in each portion of said web page for determining said layout, and employing portions of said web page as nodes for generating, as said structure of said layout, a tree structure wherein a strength of said delimiters are hierarchically recorded;

a web page division process for dividing said web page into regions that are allocated to reflect said structure of said layout of said web page that is obtained in said web page layout structure analyzation process, when contents of said web page are displayed under a user's desired display condition, said division process including ascertaining said regions that satisfy a predetermined rule concerning said layout of said web page structure and that preserve portions, corresponding to each of said nodes in said tree structure, that are large enough to display a part of the contents of said original document using characters that match said desired display condition; and a web page contents determination process for, in order to display said web page using a browser, determining the contents of said web page that are to be displayed inside each of said allocated regions determined in said web page division process, wherein contents of the original document are displayed according to said user's desired display condition such that sizes and the positions of the regions are controlled to maintain a balance between the preservation of the structure of the layout for the document and loss of content.

14. A storage medium on which a computer-readable program is stored by input means provided for a computer, said computer readable program permitting said computer to perform:
- an HTML web page layout structure analyzation process for analyzing the structure of the layout for said web page, said web page comprising contents of an original document, said analyzation process detecting a delimiter used in each portion of said web page for determining said layout, and employing portions of said web pages as nodes for generating, as said structure of said layout, a tree structure wherein a strength of said delimiters are hierarchically recorded;
- a web page division process for dividing said web page into regions that are allocated to reflect said structure of said layout of said web page that is obtained in said web page layout structure analyzation process, when the contents of said web page are displayed under a user's desired display condition, said division process including ascertaining said regions that satisfy a predetermined rule concerning said layout of said web page structure and that preserve portions, corresponding to each of said nodes in said free structure, that are large enough to display a part of the contents of said original document using characters that match said desired display condition;
- a web page contents determination process for determining the contents of said web page that are to be displayed inside each of said allocated regions determined in said web page division process; and
- a web page contents display process for arranging, in a window for displaying said web page, said allocated regions determined in said web page division process; and
- a web page display process for displaying said contents of said web page that are determined in said web page contents determination process, wherein contents of the original document are displayed according to said user's desired display condition such that sizes and positions of the regions are controlled to maintain a balance between the preservation of the structure of the layout for the document and loss of content.

15. A program transmission apparatus comprising
storage means for storing a program that permits a computer to perform operations;
- an HTML web page layout structure analyzation process for analyzing a structure of a layout for said web page, said web page comprising contents of an original document, said analyzation process detecting a delimiter used in each portion of said web page for determining said layout, and employing portions of said web page as nodes for generating, as said structure of said layout, a tree structure wherein a strength of said delimiters are hierarchically recorded;
- a web page division process for, when contents of said web page are displayed under a user's desired display condition, dividing said web page into regions that are allocated to reflect said structure of said layout of said web page that is obtained in said web page layout structure analyzation process, said division process including ascertaining said regions that satisfy a predetermined rule concerning said layout of said web page structure and that preserve portions, corresponding to each of said nodes in said tree structure, that are large enough to display a part of the contents of said original document using characters that match said desired display condition, and
- a web page contents determination process for determining the contents of said web page to be displayed inside each of said allocated regions determined in said web page division process such that sizes and the positions of the regions are controlled to maintain a balance between the preservation of the structure of the layout for the document and loss of content, in order to display said web page using a browser; and
- transmission means for reading said program from said storage means and for transmitting said program, wherein contents of the original document are displayed according to said user's desired display condition, while preserving the layout of the original document.

16. An program transmission apparatus according to claim 15, wherein said storage means stores a web page that includes said program as an embedded script or object.

17. An information processing system comprising:
- a display for displaying contents of a web page comprising contents of an original document having a predetermined layout; and
- a display controller for controlling a method used by the display to display the document contents according to a user's desired display condition, said method including:
  - a layout structure analyzation step for analyzing a structure of a layout for said web page, said analyzation process detecting a delimiter used in each portion of said web page for determining said layout, and employing portions of said web page as nodes for generating, as said structure of said layout, a tree structure wherein a strength of said delimiters are hierarchically recorded; and, a
  - web page division step for, when contents of said web page are displayed under a user's desired display condition comprising one or more of: a desired font size, a desired line spacing or desired character spacing, dividing said web page into regions that are allocated to reflect said structure of said layout of said web page that is obtained in said web page layout structure analyzation step, said division process including ascertaining said regions that satisfy a predetermined rule concerning said layout of said web page structure and that preserve portions, corresponding to each of said nodes in said tree structure, that are large enough to display a part of the contents of said original document using characters that match said user's desired display condition,
  - wherein contents of the original document are displayed according to said user's desired display condition such that sizes and the positions of the regions are controlled to maintain a balance between the preservation of the structure of the layout for the document and loss of content.

18. An information processing system according to claim 17, wherein the display controller includes:
- a layout structure analyzer for performing said web page layout structure analyzation step for analyzing the structure of the layout of the original document;
- a region arrangement determiner for performing said web page division step for dividing a web page, under said user's desired display condition whereby the contents of the page are displayed, in order to display the document in accordance with regions that are allocated and that reflect the structure of the document layout that is obtained by the layout structure analyzer; and an intra-region contents determiner for determining which contents of the original document are to be displayed inside each of the regions that are allocated that are determined by the region arrangement determiner.

19. A web page display control method for controlling display of an HTML web page comprising contents of an original document using a browser, comprising:

analyzing a structure of a layout for said web page corresponding to said original document, said analyzing including detecting a delimiter used in each portion of said web page for determining said layout, and employing portions of said web page as nodes for generating, as said structure of said layout, a tree structure wherein a strength of said delimiters are hierarchically recorded;

dividing said web page into regions that are allocated to reflect said structure of said layout of said web page obtained in the step of analyzing, when contents of said web page are displayed under a user's desired display condition, said dividing including ascertaining said regions that satisfy a predetermined rule concerning said layout of said web page structure and that preserve portions, corresponding to each of said nodes in said tree structure, that are large enough to display a part of the contents of said original document using characters that match said desired display condition;

determining the contents of said web page that are to be displayed inside each of said allocated regions determined in the step of dividing; and arranging in a window for displaying said web page, said assigned regions determined in the step of dividing; and displaying said contents of said web page determined in the step of determining, wherein contents of the original document are displayed according to said user's desired display condition such that sizes and the positions of the regions are controlled to maintain a balance between the preservation of the structure of the layout for the document and loss of content.

20. A web page display control method according to claim 19, wherein the step of analyzing includes the steps of:

employing style information written on said web page to extract a first tree structure wherein portions of said document that are separated in accordance with said style information are defined as nodes; and ranking each of said nodes of said first tree structure based on the level of said delimiter that is predetermined for said style information, and generating a second tree structure wherein a node that corresponds to the style information having the highest level of delimiter is employed as a root node and the level of said delimiter is reflected.

21. A web page display control method according to claim 19, further comprising the step of:

receiving a request designating an assigned region determined in the step of dividing performed following the step of displaying, and displaying contents of a portion of said web page included in said assigned region.

22. An information processing method for displaying contents of an original document which has a predetermined layout, comprising:

detecting a delimiter used in each portion of an original document for determining a layout, and employing portions of said original document as nodes for generating, as a structure of said layout, a tree structure wherein a strength of said delimiters are hierarchically recorded;

extracting a structure of the layout for said original document as a combination of several areas that satisfy a predetermined rule concerning said layout of said web page structure and that preserve portions, corresponding to each of said nodes in said tree structure, that are large enough to display a part of the contents of said web page using characters that match a desired display condition;

increasing a size of characters in a font used in an area in accordance with said desired display condition while preserving sizes and locations of said areas; and selectively displaying said characters included in said areas in accordance with a predetermined condition, wherein contents of the original document are displayed according to a user's desired display condition such that sizes and the positions of the areas are controlled to maintain a balance between the preservation of the structure of the layout for the document and loss of content.

23. An article of manufacture comprising a computer usable medium having computer readable program code means embodied therein for causing display of contents of an original document which has a predetermined layout, the computer readable program code means in said article of manufacture comprising computer readable program code means for causing a computer to effect the steps of claim 22, wherein contents of the original document are displayed according to said predetermined condition, while preserving the layout of the original document.

24. A computer program product comprising a computer usable medium having computer readable program code means embodied therein for causing display of contents of an original document which has a predetermined layout, the computer readable program code means in said computer program product comprising computer readable program code means for causing a computer to effect the steps of claim 22, wherein contents of the original document are displayed according to said predetermined condition, while preserving the layout of the original document.

25. An article of manufacture comprising a computer usable medium having computer readable program code means embodied therein for causing control of a display of an HTML web page comprising contents of an original document using a browser, the computer readable program code means in said article of manufacture comprising computer readable program code means for causing a computer to effect the steps of claim 8, wherein contents of the original document are displayed according to said user's desired display condition, while preserving the layout of the original document.

26. A computer program product comprising a computer usable medium having computer readable program code means embodied therein for causing control of a display of an HTML web page comprising contents of an original document using a browser, the computer readable program code means in said computer program product comprising computer readable program code means for causing a computer to effect the steps of claim 8, wherein contents of the original document are displayed according to said user's desired display condition, while preserving the layout of the original document.

27. An article of manufacture comprising a computer usable medium having computer readable program code means embodied therein for causing a browser to control the display of an HTML web page comprising contents of an original document, the computer readable program code means in said article of manufacture comprising computer readable program code means for causing a computer to effect the steps of claim 12, wherein contents of the original document are displayed while preserving the layout of the original document.

28. A computer program product comprising a computer usable medium having computer readable program code means embodied therein for causing a browser to control the display of an HTML web page comprising contents of an original document, the computer readable program code means in said computer program product comprising computer readable program code means for causing a computer to effect the steps of claim 12, wherein contents of the original document are displayed while preserving the layout of the original document.

* * * * *